United States Patent
Cammarano et al.

(10) Patent No.: US 12,447,238 B2
(45) Date of Patent: *Oct. 21, 2025

(54) ANTIMICROBIAL TUBULAR CONDUITS

(71) Applicant: SANIDRINK S.R.L., Naples (IT)

(72) Inventors: Aniello Cammarano, Ascea (IT); Luigi Nicolais, Ercolano (IT)

(73) Assignee: SANIDRINK S.R.L., Naples (IT)

( * ) Notice: Subject to any disclaimer, the term of this patent is extended or adjusted under 35 U.S.C. 154(b) by 586 days.

This patent is subject to a terminal disclaimer.

(21) Appl. No.: 17/907,290

(22) PCT Filed: Mar. 26, 2021

(86) PCT No.: PCT/IB2021/052520
§ 371 (c)(1),
(2) Date: Sep. 26, 2022

(87) PCT Pub. No.: WO2021/191852
PCT Pub. Date: Sep. 30, 2021

(65) Prior Publication Data
US 2023/0147595 A1 May 11, 2023

(30) Foreign Application Priority Data
Mar. 27, 2020 (IT) .................. 102020000006481

(51) Int. Cl.
*A61L 29/16* (2006.01)
*A47G 21/18* (2006.01)
*A61L 29/04* (2006.01)
*A61M 39/08* (2006.01)

(52) U.S. Cl.
CPC ............ *A61L 29/16* (2013.01); *A47G 21/188* (2013.01); *A61L 29/048* (2013.01); *A61M 39/08* (2013.01); *A61L 2300/404* (2013.01); *A61M 2205/0205* (2013.01)

(58) Field of Classification Search
None
See application file for complete search history.

(56) References Cited

U.S. PATENT DOCUMENTS

2015/0209567 A1  7/2015 Coulson et al.
2018/0194967 A1  7/2018 Ulery et al.

FOREIGN PATENT DOCUMENTS

WO      2015038339 A1    3/2015
WO   WO 2015/038339    *  3/2015  ............ A61K 38/08
WO      2019012158 A1    1/2019

OTHER PUBLICATIONS

International Search Report and Written Opinion for corresponding International Patent Application No. PCT/IB2021/052520, mailed Aug. 26, 2021; 12 pages.

Agrillo B. et al., Functionalized Polymeric Materials with Bio-Derived Antimicrobial Peptides for "Active" Packaging, International Journal of Molecular Sciences, Jan. 30, 2019, p. 601, vol. 20, No. 3.

Wang G. et al., APD3: the antimicrobial peptide database as a tool for research and education, Nucleic Acids Research, Jan. 4, 2016, pp. D1087-D1093, vol. 44, Issue D1, Oxford University Press.

Koehbach J. et al., The Vast Structural Diversity of Antimicrobial Peptides, Trends in Pharmacological Sciences, Jul. 1, 2019, pp. 517-528, vol. 40, Issue 7, Cell Press, Elsevier Ltd.

Sukrita Punyauppa-Path et al., Nisin: Production and Mechanism of Antimicrobial Actio, International Journal of Current Research and Review, Jan. 2015, pp. 47-53, vol. 7, Issue 2, IJCRR.

Heike Brötz, Hans-Georg Sahl, New insights into the mechanism of action of lantibiotics—diverse biological effects by binding to the same molecular targe, Journal of Antimicrobial Chemotherapy, Jul. 2000, pp. 1-6, vol. 46, Issue 1, The British Society for Antimicrobial Chemotherapy.

Shahmiri M. et al., Membrane Core-Specific Antimicrobial Action of Cathelicidin LL-37 Peptide Switches Between Pore and Nanofibre Formation, Scientific Reports, Nov. 30, 2016, vol. 6, Article No. 38184, Nature.

Mikut R. et al., Improving short antimicrobial peptides despite elusive rules for activity, Biochimica et Biophysica Acta (BBA)—Biomembranes, May 2016, pp. 1024-1033, vol. 1858, Issue 5, Elsevier.

Hegemann D. et al., Plasma treatment of polymers for surface and adhesion improvement, Nuclear Instruments and Methods in Physics Research Section B: Beam Interactions with Materials and Atoms, Aug. 2003, pp. 281-286, vol. 208, Elsevier.

Wang H. X. et al., Isolation of cucurmoschin, a novel antifungal peptide abundant in arginine, glutamate and glycine residues from black pumpkin seeds, Peptides, Jul. 2003, pp. 969-972, vol. 24, Issue 7, Elsevier.

Bilikova K., Structure and antimicrobial activity relationship of royalisin, an antimicrobial peptide from royal jelly of Apis mellifera, Peptides, Jun. 2015, pp. 190-196, vol. 68, Elsevier.

McWilliam H. et al., Analysis Tool Web Services from the EMBL-EBI, Nucleic Acids Research, Jul. 1, 2013, pp. W597-W600, vol. 41, Issue W1, Oxford University Press.

(Continued)

*Primary Examiner* — Craig D Ricci
(74) *Attorney, Agent, or Firm* — Armstrong Teasdale LLP

(57) ABSTRACT

Tubular conduits are provided which have an outer surface and/or an inner surface functionalized with at least one antimicrobial peptide having the sequence $X_1X_2WVX_3IWVX_4X_5$, wherein $X_1$, $X_2$, $X_3$, $X_4$ and $X_5$ are independently selected from K and R and wherein each amino acid is independently in the D or L configuration, or a salt or solvate thereof. The tubular conduits are preferably made of biodegradable polymeric material. The functionalization of the tubular conduits with the at least one antimicrobial peptide prevents contamination caused by Gram negative bacteria, Gram positive bacteria, fungi, yeasts and/or viruses.

12 Claims, 6 Drawing Sheets
Specification includes a Sequence Listing.

(56) References Cited

OTHER PUBLICATIONS

Koonin EV, Galperin MY, Sequence—Evolution—Function: Computational Approaches in Comparative Genomic, Chapter 4, Principles and Methods of Sequence Analysis, 2003, Kluwer Academic, Boston, MA, US.
Boman Hans G., Peptide Antibiotics and Their Role in Innate Immunity, Annual Review of Immunology, Apr. 1995, pp. 61-92, vol. 13, Annual Reviews Inc.
Pazderková M. et al., Interaction of Halictine-Related Antimicrobial Peptides with Membrane Models, International Journal of Molecular Sciences, Feb. 1, 2019, vol. 20, Issue 3, Article 631, MDPI, Basel, CH.
Zelezetsky I. et al., Alpha-helical antimicrobial peptides—Using a sequence template to guide structure-activity relationship studies, Biochimica et Biophysica Acta (BBA)—Biomembranes, Sep. 2006, pp. 1436-1449, vol. 1758, Issue 9, Elsevier B.V.
Wang Y. et al., Design of novel analogues of short antimicrobial peptide anoplin with improved antimicrobial activity, Journal of Peptide Science, first published online Oct. 14, 2014, pp. 945-951, vol. 20, Issue12, European Peptide Society and John Wiley & Sons Ltd.
Hyung-Sik Won et al., Structural Determinants for the Membrane Interaction of Novel Bioactive Undecapeptides Derived from Gaegurin 5, Journal of Medicinal Chemistry, Aug. 10, 2006, pp. 4886-4895, vol. 49, Issue 16, American Chemical Society, US.
Tompa P. et al., Intrinsically disordered proteins: emerging interaction specialists, Current Opinion in Structural Biology, Dec. 2015, pp. 49-59, vol. 35, Elsevier Ltd.
Chan David I., Tryptophan- and arginine-rich antimicrobial peptides: Structures and mechanisms of action, Biochimica et Biophysica Acta (BBA)—Biomembranes, Sep. 2006, pp. 1184-1202, vol. 1758, Issue 9, Elsevier B.V.
Cardoso Marlon H., Chapter Ten—The Structure/Function Relationship in Antimicrobial Peptides: What Can we Obtain From Structural Data?, Advances in Protein Chemistry and Structural Biology, 2018, pp. 359-384, vol. 112, Elsevier Inc.

* cited by examiner

SEQUENCE LISTING

```
<160> NUMBER OF SEQ ID NOS: 33

<210> SEQ ID NO 1
<211> LENGTH: 10
<212> TYPE: PRT
<213> ORGANISM: Artificial Sequence
<220> FEATURE:
<223> OTHER INFORMATION: AMP

<400> SEQUENCE: 1

Arg Leu Lys Trp Val Arg Ile Trp Arg Arg
1               5                   10

<210> SEQ ID NO 2
<211> LENGTH: 10
<212> TYPE: PRT
<213> ORGANISM: Artificial Sequence
<220> FEATURE:
<223> OTHER INFORMATION: AMP

<400> SEQUENCE: 2
```

Lys Leu Arg Trp Val Arg Ile Trp Arg Arg
1               5                   10

<210> SEQ ID NO 3
<211> LENGTH: 10
<212> TYPE: PRT
<213> ORGANISM: Artificial Sequence
<220> FEATURE:
<223> OTHER INFORMATION: AMP

<400> SEQUENCE: 3

Arg Leu Arg Trp Val Arg Ile Trp Arg Arg
1               5                   10

<210> SEQ ID NO 4
<211> LENGTH: 10
<212> TYPE: PRT
<213> ORGANISM: Artificial Sequence
<220> FEATURE:
<223> OTHER INFORMATION: AMP

<400> SEQUENCE: 4

Lys Leu Lys Trp Val Arg Ile Trp Arg Arg
1               5                   10

<210> SEQ ID NO 5
<211> LENGTH: 10
<212> TYPE: PRT
<213> ORGANISM: Artificial Sequence
<220> FEATURE:
<223> OTHER INFORMATION: AMP

<400> SEQUENCE: 5

Arg Leu Lys Trp Val Lys Ile Trp Arg Arg
1               5                   10

<210> SEQ ID NO 6
<211> LENGTH: 10
<212> TYPE: PRT
<213> ORGANISM: Artificial Sequence
<220> FEATURE:
<223> OTHER INFORMATION: AMP

<400> SEQUENCE: 6

Lys Leu Arg Trp Val Lys Ile Trp Arg Arg
1               5                   10

<210> SEQ ID NO 7
<211> LENGTH: 10
<212> TYPE: PRT
<213> ORGANISM: Artificial Sequence
<220> FEATURE:
<223> OTHER INFORMATION: AMP

<400> SEQUENCE: 7

Arg Leu Arg Trp Val Lys Ile Trp Arg Arg
1               5                   10

<210> SEQ ID NO 8
<211> LENGTH: 10
<212> TYPE: PRT
<213> ORGANISM: Artificial Sequence
<220> FEATURE:
<223> OTHER INFORMATION: AMP

<400> SEQUENCE: 8

```
Lys Leu Lys Trp Val Lys Ile Trp Arg Arg
1               5                   10

<210> SEQ ID NO 9
<211> LENGTH: 10
<212> TYPE: PRT
<213> ORGANISM: Artificial Sequence
<220> FEATURE:
<223> OTHER INFORMATION: AMP

<400> SEQUENCE: 9

Arg Leu Lys Trp Val Arg Ile Trp Lys Arg
1               5                   10

<210> SEQ ID NO 10
<211> LENGTH: 10
<212> TYPE: PRT
<213> ORGANISM: Artificial Sequence
<220> FEATURE:
<223> OTHER INFORMATION: AMP

<400> SEQUENCE: 10

Lys Leu Arg Trp Val Arg Ile Trp Lys Arg
1               5                   10

<210> SEQ ID NO 11
<211> LENGTH: 10
<212> TYPE: PRT
<213> ORGANISM: Artificial Sequence
<220> FEATURE:
<223> OTHER INFORMATION: AMP

<400> SEQUENCE: 11

Arg Leu Arg Trp Val Arg Ile Trp Lys Arg
1               5                   10

<210> SEQ ID NO 12
<211> LENGTH: 10
<212> TYPE: PRT
<213> ORGANISM: Artificial Sequence
<220> FEATURE:
<223> OTHER INFORMATION: AMP

<400> SEQUENCE: 12

Lys Leu Lys Trp Val Arg Ile Trp Lys Arg
1               5                   10

<210> SEQ ID NO 13
<211> LENGTH: 10
<212> TYPE: PRT
<213> ORGANISM: Artificial Sequence
<220> FEATURE:
<223> OTHER INFORMATION: AMP

<400> SEQUENCE: 13

Arg Leu Lys Trp Val Lys Ile Trp Lys Arg
1               5                   10

<210> SEQ ID NO 14
<211> LENGTH: 10
<212> TYPE: PRT
<213> ORGANISM: Artificial Sequence
<220> FEATURE:
<223> OTHER INFORMATION: AMP

<400> SEQUENCE: 14

Lys Leu Arg Trp Val Lys Ile Trp Lys Arg
```

```
1               5                   10
```

<210> SEQ ID NO 15
<211> LENGTH: 10
<212> TYPE: PRT
<213> ORGANISM: Artificial Sequence
<220> FEATURE:
<223> OTHER INFORMATION: AMP

<400> SEQUENCE: 15

```
Arg Leu Arg Trp Val Lys Ile Trp Lys Arg
1               5                   10
```

<210> SEQ ID NO 16
<211> LENGTH: 10
<212> TYPE: PRT
<213> ORGANISM: Artificial Sequence
<220> FEATURE:
<223> OTHER INFORMATION: AMP

<400> SEQUENCE: 16

```
Lys Leu Lys Trp Val Lys Ile Trp Lys Arg
1               5                   10
```

<210> SEQ ID NO 17
<211> LENGTH: 10
<212> TYPE: PRT
<213> ORGANISM: Artificial Sequence
<220> FEATURE:
<223> OTHER INFORMATION: AMP

<400> SEQUENCE: 17

```
Arg Leu Lys Trp Val Arg Ile Trp Arg Lys
1               5                   10
```

<210> SEQ ID NO 18
<211> LENGTH: 10
<212> TYPE: PRT
<213> ORGANISM: Artificial Sequence
<220> FEATURE:
<223> OTHER INFORMATION: AMP

<400> SEQUENCE: 18

```
Lys Leu Arg Trp Val Arg Ile Trp Arg Lys
1               5                   10
```

<210> SEQ ID NO 19
<211> LENGTH: 10
<212> TYPE: PRT
<213> ORGANISM: Artificial Sequence
<220> FEATURE:
<223> OTHER INFORMATION: AMP

<400> SEQUENCE: 19

```
Arg Leu Arg Trp Val Arg Ile Trp Arg Lys
1               5                   10
```

<210> SEQ ID NO 20
<211> LENGTH: 10
<212> TYPE: PRT
<213> ORGANISM: Artificial Sequence
<220> FEATURE:
<223> OTHER INFORMATION: AMP

<400> SEQUENCE: 20

```
Lys Leu Lys Trp Val Arg Ile Trp Arg Lys
1               5                   10
```

```
<210> SEQ ID NO 21
<211> LENGTH: 10
<212> TYPE: PRT
<213> ORGANISM: Artificial Sequence
<220> FEATURE:
<223> OTHER INFORMATION: AMP

<400> SEQUENCE: 21

Arg Leu Lys Trp Val Lys Ile Trp Arg Lys
1               5                   10

<210> SEQ ID NO 22
<211> LENGTH: 10
<212> TYPE: PRT
<213> ORGANISM: Artificial Sequence
<220> FEATURE:
<223> OTHER INFORMATION: AMP

<400> SEQUENCE: 22

Lys Leu Arg Trp Val Lys Ile Trp Arg Lys
1               5                   10

<210> SEQ ID NO 23
<211> LENGTH: 10
<212> TYPE: PRT
<213> ORGANISM: Artificial Sequence
<220> FEATURE:
<223> OTHER INFORMATION: AMP

<400> SEQUENCE: 23

Arg Leu Arg Trp Val Lys Ile Trp Arg Lys
1               5                   10

<210> SEQ ID NO 24
<211> LENGTH: 10
<212> TYPE: PRT
<213> ORGANISM: Artificial Sequence
<220> FEATURE:
<223> OTHER INFORMATION: AMP

<400> SEQUENCE: 24

Lys Leu Lys Trp Val Lys Ile Trp Arg Lys
1               5                   10

<210> SEQ ID NO 25
<211> LENGTH: 10
<212> TYPE: PRT
<213> ORGANISM: Artificial Sequence
<220> FEATURE:
<223> OTHER INFORMATION: AMP

<400> SEQUENCE: 25

Arg Leu Lys Trp Val Arg Ile Trp Lys Lys
1               5                   10

<210> SEQ ID NO 26
<211> LENGTH: 10
<212> TYPE: PRT
<213> ORGANISM: Artificial Sequence
<220> FEATURE:
<223> OTHER INFORMATION: AMP

<400> SEQUENCE: 26

Lys Leu Arg Trp Val Arg Ile Trp Lys Lys
1               5                   10
```

<210> SEQ ID NO 27
<211> LENGTH: 10
<212> TYPE: PRT
<213> ORGANISM: Artificial Sequence
<220> FEATURE:
<223> OTHER INFORMATION: AMP

<400> SEQUENCE: 27

Arg Leu Arg Trp Val Arg Ile Trp Lys Lys
1               5                   10

<210> SEQ ID NO 28
<211> LENGTH: 10
<212> TYPE: PRT
<213> ORGANISM: Artificial Sequence
<220> FEATURE:
<223> OTHER INFORMATION: AMP

<400> SEQUENCE: 28

Lys Leu Lys Trp Val Arg Ile Trp Lys Lys
1               5                   10

<210> SEQ ID NO 29
<211> LENGTH: 10
<212> TYPE: PRT
<213> ORGANISM: Artificial Sequence
<220> FEATURE:
<223> OTHER INFORMATION: AMP

<400> SEQUENCE: 29

Arg Leu Lys Trp Val Lys Ile Trp Lys Lys
1               5                   10

<210> SEQ ID NO 30
<211> LENGTH: 10
<212> TYPE: PRT
<213> ORGANISM: Artificial Sequence
<220> FEATURE:
<223> OTHER INFORMATION: AMP

<400> SEQUENCE: 30

Lys Leu Arg Trp Val Lys Ile Trp Lys Lys
1               5                   10

<210> SEQ ID NO 31
<211> LENGTH: 10
<212> TYPE: PRT
<213> ORGANISM: Artificial Sequence
<220> FEATURE:
<223> OTHER INFORMATION: AMP

<400> SEQUENCE: 31

Arg Leu Arg Trp Val Lys Ile Trp Lys Lys
1               5                   10

<210> SEQ ID NO 32
<211> LENGTH: 10
<212> TYPE: PRT
<213> ORGANISM: Artificial Sequence
<220> FEATURE:
<223> OTHER INFORMATION: AMP

<400> SEQUENCE: 32

Lys Leu Lys Trp Val Lys Ile Trp Lys Lys
1               5                   10

```
<210> SEQ ID NO 33
<211> LENGTH: 10
<212> TYPE: PRT
<213> ORGANISM: Artificial Sequence
<220> FEATURE:
<223> OTHER INFORMATION: HE10

<400> SEQUENCE: 33

Val Arg Leu Ile Val Arg Ile Trp Arg Arg
1               5                   10
```

ANTIMICROBIAL TUBULAR CONDUITS

CROSS-REFERENCE TO RELATED APPLICATIONS

This application is a National Stage Application of International Patent Application No. PCT/IB2021/052520, having an International Filing Date of Mar. 26, 2021, which claims priority to Italian Application No. 102020000006481 filed Mar. 27, 2020, the entire contents of which are hereby incorporated by reference herein.

REFERENCE TO AN ELECTRONIC SEQUENCE LISTING

The contents of the electronic sequence listing named "39447-213_ST25"; Size: 6,052 Bytes, created on Jan. 20, 2023, is herein incorporated by reference in its entirety.

FILED OF THE INVENTION

The present invention relates to tubular conduits, for example drinking straws whose outer and/or inner surface is/are functionalized with antimicrobial peptides.

STATE OF THE ART

The rapid rise of highly resistant pathogens represents a global challenge in both the food and beverage sector and the medical sector.

In particular, drinkable water has always been considered one of the primary requirements for the health and sustainability of human life.

However, the World Health Organization (WHO) reported that 884 million people lack access to drinkable water and that 2.2 million deaths, mainly of children, are attributable to diarrhoea, which is transmitted through contaminated water, and/or inadequate sanitation or hygiene.

Bottled water is often recommended in hospital patients with immune system deficiencies. The American Society for Microbiology reported that bacteria can also grow in bottled drinking water. For example, a population of approximately $10^2$-$10^5$ colony forming units per ml (CFU/ml) was found in mineral water after bottling in Canada. These bacteria are very unlikely to cause disease, but the high levels of bacteria in bottled water could pose a risk to vulnerable populations such as pregnant women, newborns, immunocompromised patients, and the elderly. The demand for bottled water has steadily increased in recent years, making bottled water the fastest growing segment of soft drinks worldwide.

However, the massive consumption of water in disposable bottles has been linked to increased waste and soil pollution. Only a small percentage of plastic bottles is recycled. The environmental costs associated with bottled water have led to a social push for the adoption of refillable bottles.

Refillable bottles are more environmentally friendly and cost-effective because consumers can refill them repeatedly. This ability to refill and reuse water bottles requires the bottles to be cleaned on a regular basis. However, observing consumer behaviour related to refillable water bottles suggests that users regularly refill the bottles without making a corresponding effort to clean them. In addition, the shape of refillable water bottles can hinder the cleaning thereof.

Drinking straws, which are typically exposed to the environment and repeatedly introduced into the user's mouth, can be contaminated with microorganisms or other pathogens that can infect or reinfect the user.

Medical tubes used to deliver fluids, such as oxygen, liquids or drugs, to a person can also be contaminated with microorganisms or other pathogens. In fact, in order for the person to be mobile while using a medical tube, the length of the medical tube extends between the person and the dispensing station. As a result, the tube can lie on the floor, on bed sheets, or come into contact with other people during normal use, thus becoming a receptacle for microorganisms or other pathogens which can then be transferred to the person to whom the fluid is being administered, or to other people or surfaces.

*Salmonella* and *Escherichia coli* are among the most common pathogens found in food and beverages, affecting millions of people every year, sometimes with serious and fatal outcomes. Symptoms are fever, headache, nausea, vomiting, abdominal pain and diarrhoea.

*Listeria monocytogenes* can also contaminate food and beverages. *Listeria* infection leads to miscarriage in pregnant women or to the death of newborns. The serious and sometimes fatal consequences of *Listeria* on health, particularly among infants, children and the elderly, represent for these categories of people the most serious food infections, with significant mortality rates in the context of foodborne infections.

*Staphylococcus aureus* is responsible for acute suppurative infections that can occur in different parts of the body such as skin, skeletal system, respiratory system, urinary system, central nervous system. Some bacterial strains can also cause poisoning and various types of morbid manifestations due to some characteristic exotoxins they are capable of producing. Antibiotic resistance is a highly frequent feature of the Staphylococcaceae family, especially in the so-called nosocomial infections that can be contracted in the hospital environment. The causes of these infections are usually iatrogenic and are frequently found in the blood of subjects with prosthetic as well as intravascular implants. These infections are a problem that can often be difficult to solve, due to a widespread drug resistance, in many cases to multiple drugs; many strains of antibiotic-resistant pathogenic bacteria are now known and studied, including the so-called MRSA (meticillin resistant *Staphylococcus aureus*).

Therefore, there is a need to provide tubular conduits suitable for use in both the food and medical fields, which are hygienically safe.

Application US20150209567 discloses a tubular conduit made of polymeric material having an outer layer, an inner layer and an intermediate layer, wherein the outer and/or inner layer(s) incorporate(s) an antimicrobial agent such as silver. Silver can be in the elemental or ionic state, in the form of nanoparticles or zeolites, and optionally in combination with zinc.

Antimicrobial peptides (AMPs) are produced in many tissues and cell types of organisms such as plants, insects, amphibians and higher organisms and are components of the innate immunity. Their amino acid composition and structure-related chemical-physical characteristics allow them to interact selectively with the lipid bilayer of the bacterial membrane, thereby causing the death of microorganisms. Antimicrobial peptides appear to have a high potential for activity on bacterial strains pathogenic for humans, both Gram negative and Gram positive; furthermore, these peptides, unlike other drugs currently in use, do not easily select mutants and do not induce antibiotic-resistance phenomena.

In recent years, numerous antimicrobial peptides have been identified through various techniques ranging from in silico analysis to the screening of peptide libraries.

In particular, patent application WO2015038339 describes the structure of 753 7-12-amino acid peptides, which are indicated as having an anti-biofilm and/or immunomodulatory activity. Some of the peptides described therein have been tested for their ability to inhibit biofilms formed by *Pseudomonas aeruginosa, Klebsiella pneumoniae, Staphylococcus aureus, E. coli, Acinetobacter baumannii, Salmonella enterica* ssp. *Typhimurium, Burkholderia cenocepacia, Staphylococcus aureus* and *Pseudomonas aeruginosa;* however, these peptides did not exhibit activity on the planktonic cells of these bacteria at the tested concentrations. In this context, the decapeptide designated as *HE*10 is described, which has the sequence VRLIVRIWRR (SEQ ID NO: 33).

Patent application WO2019012158 discloses the use of some antimicrobial peptides, including IDR-1018-K6, as bacterial agents for the prevention and/or treatment of contamination of a product or surface by a specific bacterium, namely *Listeria monocytogenes*. This document further discloses the use of the antimicrobial peptides in the treatment of infections caused in a subject by *Listeria monocytogenes*.

To date, the studies carried out and the amount of data available in numerous databases (Wang, G., Li, X. and Wang, Z. (2016) APD3: the antimicrobial peptide database as a tool for research and education, Nucleic Acids Research 44, D1087-D1093) show that antimicrobial peptides can have different structures and target a variety of microorganisms.

Furthermore, in many cases, the peptides tend to assume the structure with which the activity is associated only after contact with cell membranes. Based on the presence or absence of two key elements of the secondary structure (α-helix and β-sheet), AMPs are commonly classified into four main classes: (i) peptides with linear α-helical structure, which represent the largest and best studied group; (ii) peptides with linear extended structures (devoid of α-helix or β-sheet elements); (iii) peptides containing β-sheets and (iv) peptides containing α-helix and β-sheet elements. Hundreds of different sequences have been identified from natural sources and a multitude of analogues and synthetic derivatives have been produced, whose size and diversity are constantly expanding (Johannes Koehbach and David J. Craik. The Vast Structural Diversity of Antimicrobial Peptides, Trends in Pharmacological Sciences, July 2019, Vol. 40, No. 7). Therefore, it appears that, to date, there is no clear structure/function relationship for this category of antimicrobial molecules, and therefore it is extremely difficult to predict their activity.

Most of the known AMPs have small dimensions, generally ranging from 12 to 50 amino acid residues. The longer ones, such as Nisin (34 aa) or LL37 (37 aa), are at least partially structured, also thanks to the longer amino acid chain thereof.

Although the antibacterial action of Nisin has been known for decades, its mechanism of action still requires further investigation. This may be due to the fact that Nisin exerts its action through different mechanisms depending on the structural properties of the membranes of the target bacteria. Nisin itself is only active against Gram positive bacteria, however its combination with treatments disrupting the cell membrane makes it also active against Gram negative bacteria (Sukrita Punyauppa-path, Parichat Phumkhachorn, Pongsak Rattanachaikunsopon NISIN: PRODUCTION AND MECHANISM OF ANTIMICROBIAL ACTION, Int J Cur Res Rev|Vol 7•Issue 2•January 2015). Several studies show that some structural Nisin motifs are essential for the formation of the "pore" in bacterial membranes, while other portions of the peptide contribute to the bactericidal action by inhibiting cell wall synthesis. This shows that Nisin has at least two different mechanisms of action against bacteria (H Brotz and HG Sahl New insights into the mechanism of action of lantibiotics—diverse biological effects by binding to the same molecular target, Journal of Antimicrobial Chemotherapy, 2000, 46 1-6).

LL-37 also modulates its mechanism of action based on the structure of the different lipids that form the cell membrane: it induces the formation of pores in the unsaturated phospholipid bilayers and interferes with membrane functions in the presence of saturated phospholipids, producing fibrous peptide-lipid superstructures rich in α-helix structures. (Mandi Shahmiri, Marta Enciso, Christopher G. Adda, Brian J. Smith, Matthew A. Perugini & Adam Mechler Membrane Core-Specific Antimicrobial Action of Cathelicidin LL-37 Peptide Switches Between Pore and Nanofibre Formation, Scientific Reports volume 6, Article number: 38184 (2016)).

It is therefore clear that larger peptides may generally have greater folding variability and complexity, in other words they are more likely to assume various secondary structures even in different portions of the amino acid chain. Therefore, it is extremely difficult to understand and control the mechanisms by which a peptide with a longer amino acid sequence is able to carry out its biological activity, since the variables that can affect and/or impair it are more numerous. Furthermore, in case of use of a peptide for the functionalization of a polymeric surface through a covalent bond, a longer amino acid sequence would statistically increase the sites with which the peptide can be bound to the material of interest (PET; PVC; PL; etc.), making the conformations that the molecule can assume after forming the bond, (or the bonds at several points of the sequence), and consequently also the possibility of retaining the antimicrobial activity, unpredictable.

On the other hand, small molecules lend themselves better to be designed and/or modified with the aim of retaining or amplifying a specific activity. In addition, the small size of an antimicrobial peptide significantly reduces the costs for the synthesis and purification thereof. However, the shorter antimicrobial peptides have a lower percentage probability of being structured than the longer ones and it is therefore equally difficult to predict their activity (Ralf Mikut, Serge Ruden, Markus Reischl, Frank Breitling, Rudolf Volkmer, Kai Hilpert. Improving short antimicrobial peptides despite elusive rules for activity Biochimica et Biophysica Acta 1858 (2016) 1024-1033).

In the light of the above, it is clear that there is a need to provide tubular conduits suitable for use both in the food and medical fields, which are functionalized with antimicrobial agents, in particular of the peptide type, capable of carrying out an effective antimicrobial activity on a broad spectrum of microorganisms, including Gram negative and Gram positive bacteria, fungi and yeasts, and possibly also having antiviral action. A further need is that the aforementioned antimicrobial peptides have an amino acid chain of moderate length, possibly shorter than that of the currently known antimicrobial peptides. Yet another need is that the costs for the synthesis and purification of the aforementioned peptides are as low as possible.

SUMMARY OF THE INVENTION

In order to meet these and other needs, the present inventors investigated several antimicrobial agents suitable for functionalizing the outer and/or inner surface(s) of tubular conduits made of various materials such as, for example, polymeric materials, glass and metals, and identified antimicrobial peptides (AMPs) particularly suitable for this purpose. These antimicrobial peptides consist of the amino acid sequence represented by the general formula (I). They are particularly suitable for the purpose indicated above because they possess a broad spectrum antimicrobial activity and are characterized by a relatively short amino acid sequence.

Example 1 in the following experimental part shows the synthesis of the RiLK1 peptide, which is representative of peptides of the general formula (I) used in the scope of the present invention.

The RiLK1 peptide and all the other AMP peptides of formula (I) share the fact that they contain the structural motif W-X-X-X-W and have similar values of hydrophobicity, hydropathicity, amphiphilicity, hydrophilicity, net charge, Boman index and propensity for a disordered conformation, which are indicative of similar bactericidal properties (see Examples 5 and 6).

Examples 2a and 2b show that the RiLK1 peptide exhibits strong bactericidal activity both against Gram negative bacteria, such as *S. typhimurium* and *E. coli*, and against Gram positive bacteria, such as *S. aureus* and *L. monocytogenes*. Furthermore, it has also been shown to have an effective antimicrobial activity against fungi and yeasts, such as *Aspergillus brasiliensis* and *Candida albicans* (Example 2c).

Example 3 shows that RiLK1 is able to bind to the polymeric surface of a straw made of polymeric material with a 17% bond yield, resulting in a straw functionalized with the antimicrobial agent. Furthermore, the functionalized straw placed in water for 24 hours remains stable without release of the antimicrobial peptide.

As shown in Example 4, the straw made of polymeric material functionalized with the antimicrobial peptide RiLK1 exhibits bactericidal activity both against Gram negative bacteria, such as *S. typhimurium* and *E. coli*, and against Gram positive bacteria, such as *Staphylococcus aureus* and *L. monocytogenes*.

Therefore, a first object of the present invention is a tubular conduit comprising an outer surface and an inner surface, characterized in that at least one portion of the outer and/or inner surface is functionalized with at least one antimicrobial peptide consisting of the formula (I) set out below. The at least one antimicrobial peptide is covalently linked to reactive groups which are present on the outer and/or inner surface of the tubular conduit, or alternatively, it is contained in a coating attached thereto.

A second object of the present invention is the use of an antimicrobial peptide consisting of the formula (I), for the prevention of contamination of a tubular conduit by Gram negative bacteria, Gram positive bacteria, fungi, yeasts and/or viruses.

A third object of the present invention is a container such as, for example, a bottle, a canteen or a jar, provided with a removable straw functionalized with an antimicrobial peptide consisting of the formula (I), whose function is to reduce the risk of contamination by pathogens. More specifically, the removable straw of the container of the invention comprises an outer surface and an inner surface, wherein at least one portion of the outer and/or inner surface(s) is functionalized with at least one antimicrobial peptide of formula (I).

BRIEF DESCRIPTION OF THE FIGURES

FIG. 1 shows dose-response curves obtained with the RiLK1 peptide against *S. aureus* (A), *L. monocytogenes* (B), *S. typhimurium* (C) and *E. coli* (D); the abscissa axis shows the peptide concentration (μM), the ordinate axis shows the % of surviving cells, as described in Example 2a.

DETAILED DESCRIPTION OF THE INVENTION

Figure 1:
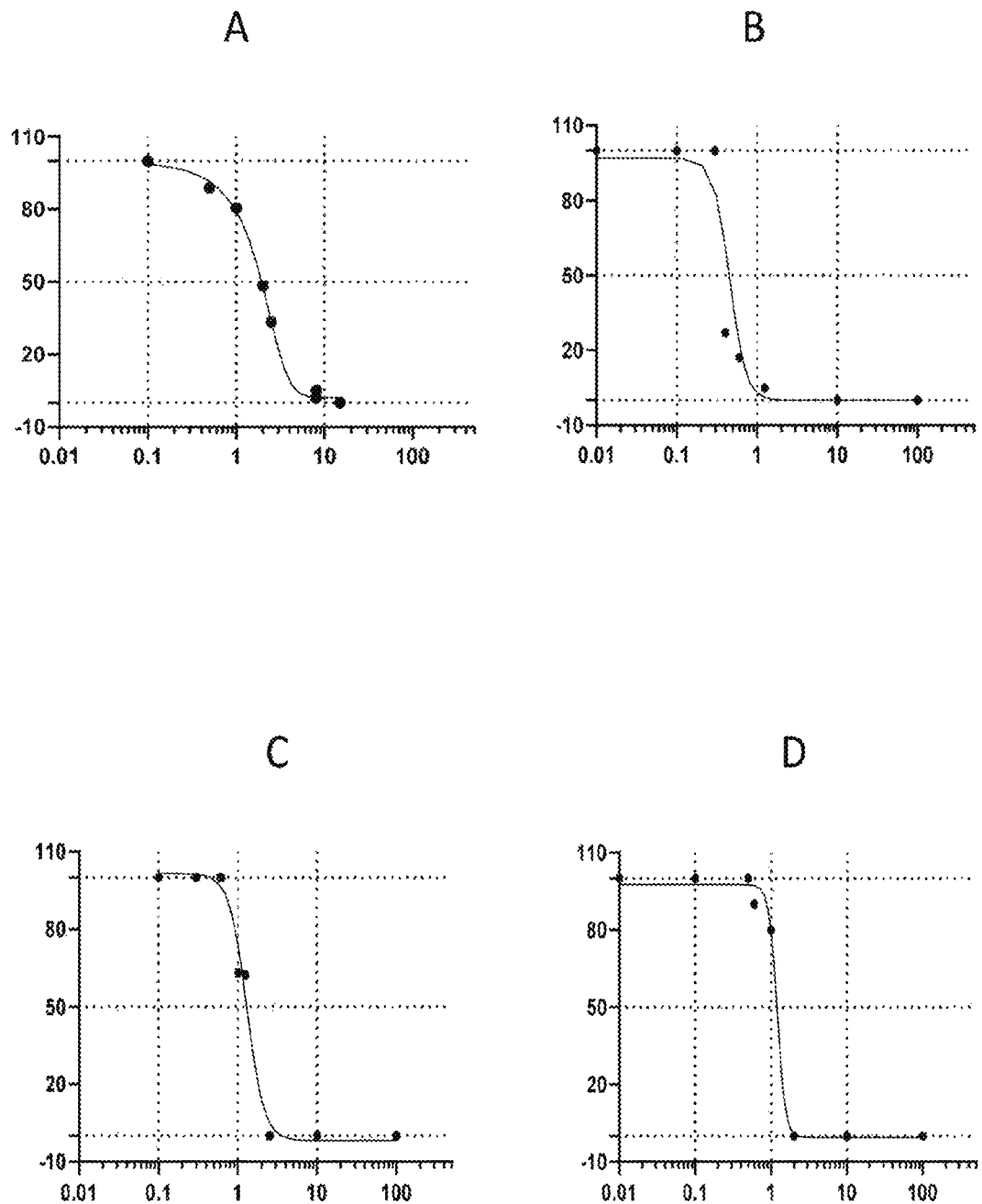

A first object of the present invention is a tubular conduit comprising an inner surface and an outer surface, characterized in that at least one portion of the outer and/or inner surface(s) is functionalized with at least one antimicrobial peptide consisting of the formula (I).

In preferred embodiments, the at least one antimicrobial peptide is covalently linked to reactive groups which are present on the at least one portion of the outer and/or inner surface(s) of the tubular conduit; alternatively, the at least one antimicrobial peptide is contained in a coating attached to the at least one portion of the outer and/or inner surface(s) of the tubular conduit.

As indicated above, the at least one antimicrobial peptide consists of the amino acid sequence represented by the formula (I) shown below:

$$X_1LX_2WVX_3IWX_4X_5 \quad (I)$$

wherein $X_1$, $X_2$, $X_3$, $X_4$ and $X_5$ are independently selected from K and R and wherein each amino acid is independently in the D or L configuration, or a salt or a solvate thereof.

It should be noted that all amino acid sequences are represented in the present description by formulas whose orientation from left to right is in the conventional direction, i.e., from the amino terminus to the carboxyl terminus.

According to a preferred embodiment, the amino acids in the above formula (I) are all in the D configuration or in the L configuration.

According to another preferred embodiment, in the above formula (I), at least one of $X_1$, $X_3$, $X_4$ and $X_5$ has the meaning of R; more preferably, $X_4$ and $X_5$ have the meaning of R; still more preferably, $X_3$, $X_4$ and $X_5$ have the meaning of R; even more preferably, $X_1$, $X_3$, $X_4$ and $X_5$ have the meaning of R.

In another preferred embodiment, $X_2$ has the meaning of K.

In another preferred embodiment, at least one of $X_1$, $X_3$, $X_4$ and $X_5$ has the meaning of R and $X_2$ has the meaning of K; more preferably, $X_4$ and $X_5$ have the meaning of R and $X_2$ has the meaning of K; still more preferably, $X_3$, $X_4$ and $X_5$ have the meaning of R and $X_2$ has the meaning of K; even more preferably, $X_1$, $X_3$, $X_4$ and $X_5$ have the meaning of R and $X_2$ has the meaning of K.

The following amino acid sequences are particularly preferred:

$RLX_2WVRIWX_4X_5$, $RLX_2WVRIWRX_5$, $RLX_2WVRIWX_4K$, $RLKX_2WVRIWKK$, $X_1LKWVX_3IWRR$, $X_1LKWVRIWRR$, $RLKWVX_3IWRR$, $X_1LRWVX_3IWKK$, $X_1LRWVKIWKK$, $KLRWVX_3WKK$, wherein $X_1$, $X_2$, $X_3$, $X_4$ and $X_5$ are independently selected from K and R and wherein each amino acid is independently in the D or L configuration.

The following specific amino acid sequences are further preferred:

RLKWVRIWRR, (SEQ ID NO: 1)
KLRWVRIWRR, (SEQ ID NO: 2)
RLRWVRIWRR, (SEQ ID NO: 3)
KLKWVRIWRR, (SEQ ID NO: 4)
RLKWVKIWRR, (SEQ ID NO: 5)
KLRWVKIWRR, (SEQ ID NO: 6)
RLRWVKIWRR, (SEQ ID NO: 7)
KLKWVKIWRR, (SEQ ID NO: 8)
RLKWVRIWKR, (SEQ ID NO: 9)
KLRWVRIWKR, (SEQ ID NO: 10)
RLRWVRIWKR, (SEQ ID NO: 11)
KLKWVRIWKR, (SEQ ID NO: 12)
RLKWVKIWKR, (SEQ ID NO: 13)
KLRWVKIWKR, (SEQ ID NO: 14)
RLRWVKIWKR, (SEQ ID NO: 15)
KLKWVKIWKR, (SEQ ID NO: 16)
RLKWVRIWRK, (SEQ ID NO: 17)
KLRWVRIWRK, (SEQ ID NO: 18)
RLRWVRIWRK, (SEQ ID NO: 19)
KLKWVRIWRK, (SEQ ID NO: 20)
RLKWVKIWRK, (SEQ ID NO: 21)
KLRWVKIWRK, (SEQ ID NO: 22)
RLRWVKIWRK, (SEQ ID NO: 23)
KLKWVKIWRK, (SEQ ID NO: 24)
RLKWVRIWKK, (SEQ ID NO: 25)
KLRWVRIWKK, (SEQ ID NO: 26)
RLRWVRIWKK, (SEQ ID NO: 27)
KLKWVRIWKK, (SEQ ID NO: 28)
RLKWVKIWKK, (SEQ ID NO: 29)
KLRWVKIWKK, (SEQ ID NO: 30)
RLRWVKIWKK, (SEQ ID NO: 31)
KLKWVKIWKK, (SEQ ID NO: 32)

wherein each amino acid is independently in the D or L configuration.

The peptide with the sequence SEQ ID NO: 1 is the one indicated as "RiLK1" in the scope of the present description.

In the context of the present invention, the term "solvate" or "solvates" refers to complexes of the peptides of the invention with the solvents in which the synthesis reaction takes place or in which they are precipitated or crystallized. For example, a complex with water is known as a "hydrate".

Salts and solvates suitable for the purposes of the invention are those that do not lead to a change in the conformation or stability of the peptides according to the invention, and therefore, do not interfere with their biological activity.

Preferred salts according to the invention are pharmaceutically acceptable salts that do not lead to a change in the conformation or stability of the peptides according to the invention. By way of illustrative and non-limiting examples, pharmaceutically acceptable acid addition salts include those formed with the hydrochloric, hydrobromic, acetic, phosphoric, lactic, pyruvic, acetic, trifluoroacetic, succinic, perchloric, fumaric, maleic, glycolic, lactic, salicylic, oxaloacetic, methanesulfonic, ethanesulfonic, p-toluenesulfonic, formic, benzoic, malonic, naphthalene-2-sulfonic, benzenesulfonic and isethionic acids. Other acids, such as oxalic acid, although not pharmaceutically acceptable per se, can be useful as intermediates for obtaining the peptides of the invention and pharmaceutically acceptable salts thereof. Acceptable base salts include ammonium salts, alkali metal salts, for example potassium and sodium salts, alkaline earth metal salts, for example calcium and magnesium salts, and salts with organic bases, for example dicyclohexylamine and N-methyl-D-glucosamine.

Preferably, according to the invention, the tubular conduit is a drinking straw or a medical tube; more preferably, it is a drinking straw incorporated in and optionally removable from a container such as, for example, a bottle, a canteen or a can.

In a preferred embodiment, the tubular conduit is a straw for food or beverages.

Preferably, according to the invention, the number of moles of the at least one antimicrobial peptide which are present on the at least one portion of the outer and/or inner surface(s) of the tubular conduit is between 1 and 10 nmol×cm$^2$ of the surface, more preferably between 1.5 and 3 nmol×cm$^2$ of the surface.

According to the invention, the material of the tubular conduit preferably is a polymer; suitable polymers are, by way of illustrative and non-limiting example, styrene block copolymers, polyolefin mixtures, elastomeric mixtures, thermoplastic polyurethanes, thermoplastic copolyesters, thermoplastic polyamides, polypropylene, polyethylene, high density polyethylene, low density polyethylene, polyethylene terephthalate, poly-1,4 cyclohexanedimethylene terephthalate, polyethylene 2,6 naphthalate dibenzoate, polyolefin, polyvinylidene fluoride, polyethylene 2,6 naphthalate, acrylonitrile butadiene styrene, polyvinyl chloride, polyether block amide, biodegradable polymers, and mixtures thereof. More preferably, the polymeric material is a biodegradable polymer such as, for example, polylactic acid (PLA), polybutylene adipate-co-terephthalate (PBAT), polycaprolactone (PCL), modified starch (MaterBi®) or polyglycolic acid (PGA), polybutylene succinate (PBS), poly-hydroxy alkanoates (PHA) (family of MaterBi® materials), and mixtures thereof. Even more preferably, the polymeric material is polylactic acid.

The present inventors investigated different types of polymers and found that PLA is particularly suitable for being functionalized for the purpose of the present invention. PLA is a thermoplastic polymer belonging to the aliphatic polyester family, with properties similar to those of polyethylene terephthalate (PET). It is derived from sugar, so it is a product derived from 100% natural resources and therefore has zero environmental impact. PLA can be easily processed with conventional machines for thermoforming and single or biaxial extrusion of polymeric films, by injection and by foaming. PLA is 100% biodegradable and compostable. PLA is stable in standard environmental conditions (20° C., 1 Atm), is degraded by hydrolysis at temperatures above 65° C. and humidity above 20%, so biodegradation times can vary considerably depending on the environmental conditions. At 65° C. and 95% humidity, which are the standard conditions of a normal composting station, PLA-based products are degraded in about 50 days. If left on the ground, PLA-based products degrade in 15 months, in 24 months if burned, in 48 months if placed in water.

Preferably, the tubular conduit according to the invention is a drinking straw or a medical tube made of PLA; more preferably, it is a drinking straw made of PLA and incorporated in and optionally removable from a container, for example, a bottle, a canteen or a can.

As indicated above, one embodiment of the invention is that in which the at least one antimicrobial peptide is covalently linked to reactive groups which are present on the at least one portion of the outer and/or inner surface(s) of the tubular conduit.

In this case, the N-terminal amino group of the peptide is covalently linked to at least one chemical group which is present on the at least one portion of the outer and/or inner surface(s) of the tubular conduit, said at least one chemical group being preferably selected from a carboxylic group, an excited hydroxyl radical, an activated alkoxy group, or an activated aldehyde or ketone group.

In fact, the present inventors found that when the N-terminal group of the peptide is covalently linked to chemical groups which are present on the surface of the tubular conduit, the bactericidal activity is maintained despite the locked conformation of the peptide, and that this bactericidal activity remains stable for long time periods.

Techniques for binding peptides to solid supports are known to those skilled in the art and vary depending on the material used. Mainly used surface functionalization methods are chemical or physical methods.

For example, in the case of materials having metal (gold, silver, platinum) or semiconductor (titanium, zinc, tin, zirconium, germanium) surfaces, a silanization process can be used. This involves, for example, reacting the material to be treated with a mixture of sulfuric acid ($H_2SO_4$) and oxygen peroxide ($H_2O_2$), which are able to activate the aforementioned surfaces by creating bonds of surface atoms and hydroxyl groups (—OH) easily replaceable by more stable bonds such as Si—C or Au—S. The activated surfaces can covalently bind the peptides of interest following treatment with a silanizing agent, such as aminopropyldimethylethoxysilane or aminopropyltriethoxysilane, and with a compound having two functional groups capable of forming the peptide covalent bond with the amino groups of the peptide, such as glutaraldehyde or bis-succinimide. These treatments are typical of the chemistry of aqueous solutions and for this reason they are referred to as wet processes, which are advantageous because they do not require particular technological equipment but only, preferably rigid, materials which can be wet and dried without difficulty.

In the case of plastic or polymeric surfaces, these can be activated to link the peptides of interest by applying both wet processes, such as those described above, and dry processes.

Wet activation, typical of the chemistry of aqueous solutions, is generally advantageous because it does not require particular technological equipment but only, preferably rigid, materials which can be wet and dried without difficulty. The activated surface is then reacted with a silanizing agent, such as aminopropyldimethylethoxysilane or aminopropyltriethoxysilane, and with a compound having two functional groups capable of forming the peptide covalent bond with the amino groups of the peptide, such as glutaraldehyde or bis-succinimide.

Dry activation is based on the interaction of the surface to be treated with electromagnetic radiation, for example laser, ultraviolet radiation, gamma rays, or with ionized gas (gas plasma). The interaction of the surface of a polymer with electromagnetic radiation causes surface activation, thereby allowing subsequent chemical modification of the surface itself. A similar operating principle also applies to the activation of polymeric surfaces by treatment with gas plasma. This method is particularly advantageous since, as the plasma is cold, the temperature of the treated material does not reach high values with respect to room temperature. This method requires low pressure (0.1-100 Pa) and the presence of a working gas (usually $N_2$, $O_2$ or Ar, $CF_4$). [Hegemann, Dirk, Herwig Brunner, and Christian Oehr. "Plasma treatment of polymers for surface and adhesion improvement." Nuclear instruments and methods in physics research section B: Beam interactions with materials and atoms 208 (2003): 281-286].

As indicated above, a further embodiment of the invention is that in which the at least one antimicrobial peptide is contained in a coating attached to at least one portion of the outer and/or inner surface(s) of the tubular conduit.

In this case, the functionalization process involves the deposition of a liquid antimicrobial composition containing the antimicrobial peptide onto the surface portion of the tubular conduit, after which the liquid antimicrobial composition is allowed to dry. The liquid antimicrobial composition can optionally comprise film-forming agents which form a film on the surface of the antimicrobial conduit, which film favours the permanence of the peptide on the surface. Therefore, the aforementioned coating may comprise a film-forming polymer.

Preferably, the concentration of the at least one antimicrobial peptide in the liquid antimicrobial composition is between 10 and 100 µM, more preferably between 20 and 80 µM, 30 and 60 µM, 40 and 60 µM.

Preferably, the incubation time of the tubular conduit in the liquid antimicrobial composition containing the at least one antimicrobial peptide is between 18 and 36 hours, more preferably between 20 and 30 hours.

As indicated above, the characteristics of the tubular conduit according to the invention are suitable for preventing contamination by Gram negative bacteria, Gram positive bacteria, fungi, yeasts and/or viruses.

Therefore, a second object of the present invention is the use of an antimicrobial peptide as defined above, for the prevention of contamination of a tubular conduit by Gram negative bacteria, Gram positive bacteria, fungi, yeasts and/or viruses.

In this context, the Gram negative bacteria are preferably selected from the group consisting of *Campylobacter* such as, for example, *Campylobacter coli*, *Campylobacter concisus*, *Campylobacter jejuni*, *Campylobacter C. rectus*; *Arcobacter* such as, for example, *Arcobacter butzleri*, *Arcobacter cryaerophilus*; *Citrobacter* such as, for example, *Citrobacter amalonaticus*, *Citrobacter braakii*, *Citrobacter farmeri*, *Citrobacter freundii*, *Citrobacter gillenii*, *Citrobacter koseri*; *Enterobacter* such as, for example, *Enterobacter aerogenes*, *Enterobacter agglomerans*, *Enterobacter cloacae*, *Enterobacter cowanii*, *Enterobacter gergoviae*; *Escherichia* such as, for example, *Escherichia coli*; *Klebsiella*; *Morganella* such as, for example, *Morganella Morganii*; *Proteus* such as, for example, *Proteus vulgaris*, *Proteus mirabilis*; *Shigella* such as, for example, *Shigella dysenteriae*; *Salmonella* such as, for example, *Salmonella typhi*, *Salmonella typhimurium*; *Yersinia* such as, for example, *Yersinia pestis*, *Yersinia pseudotuberculosis*, *Yersinia enterocolitica*; *Serratia marcescens*; *Aerobacter aerogenes*; *Enterobacter sakazakii*; *Acinetobacter*, such as, for example, *Acinetobacter baumannii*, *Acinetobacter beijerinckii*, *Acinetobacter bereziniae*, *Acinetobacter boissieri*; *Moraxella* such as, for example, *Moraxella catarrhalis* (synonym *Branhamella catarrhalis*); *Neisseria* such as, for example, *Neisseria meningitidis*; *Haemophilus* such as, for example, *Haemophilus influenzae*; *Pasteurella* such as, for example, *Pasteurella multocida*; *Pseudomonas* such as, for example, *Pseudomonas aeruginosa*; *Vibrio* such as, for example, *Vibrio cholerae*, *Vibrio fischeri*, *Stenotrophomonas maltophilia*, and combinations thereof. More preferably, the Gram negative bacteria are selected from *Salmonella typhimurium* and *Escherichia coli*.

The Gram positive bacteria are preferably selected from the group consisting of Actinobacteria such as, for example, *Tropheryma whipplei*; *Bacillus*; *Carnobacterium*; *Clostridium*; *Corynebacterium diphtheria*; *Enterococcus* such as, for example, *Enterococcus faecalis*; *Gardnerella vaginalis*; *Lactobacillus*; *Lactococcus*; *Listeria* such as, for example, *Listeria monocytogenes*; *Micrococcus*; *Staphylococcus* such as, for example, *Staphylococcus aureus*; *Streptococcus* such as, for example, *Streptococcus agalactiae*, *Streptococcus pneumoniae*, *Streptococcus pyogenes*, *Streptococcus viridans*, and combinations thereof. More preferably, the Gram positive bacteria are selected from *Listeria monocytogenes* and *Staphylococcus aureus*.

The fungi are preferably *Aspergillus brasiliensis* and the yeasts are preferably *Candida albicans*.

The viruses are preferably viruses equipped with a capsid and an additional coating called pericapsid; they can be either DNA or RNA viruses. Preferably, the virus is an adenovirus, papilloma virus (HPV), herpes virus, coronavirus, influenza virus, cytomegalovirus (CMV), HIV or Ebola virus.

The examples that follow are provided for illustration purposes only and do not limit the scope of the invention as defined in the appended claims.

EXAMPLES

Example 1—Synthesis of the RiLK1 Peptide

The RiLK1 peptide having the sequence RLKWVRIWRR (SEQ ID NO: 1) was synthesized by solid phase peptide synthesis using the protective group Fluoromethoxycarbonyl (Fmoc).

Rink-Amide MBHA resin with a degree of substitution of 0.5 mmol/g was used as a solid support. The resin has a linker that provides an amide bond and releases the peptide amidated at the C-terminus.

At the end of the synthesis, the protective group was removed by treatment with a 40% (v/v) solution of piperidine in DMF, while the detachment from the resin and the removal of the protective groups from the amino acid side chains were obtained by treatment with an acidic solution consisting of 95% trifluoroacetic acid, 2.5% triisopropylsilane, and 2.5% $H_2O$ (v/v/v).

After the detachment from the solid support, the peptide was precipitated in cold ethyl ether, at −20° C. The sample was centrifuged at 3500 rpm for 5 minutes in order to collect the precipitate. The precipitate was dissolved in a mixture of $CH_3CN/H_2O$ (95:5), frozen and lyophilized.

This procedure can be used for the synthesis of all AMP peptides employed in the invention.

Example 2—Analysis of the Bactericidal Activity of RiLK1

Example 2a—Assessment of the Concentration Capable of 50% Bacterial Growth Inhibition ($IC_{50}$)

The bactericidal activity of RiLK1 peptides was assessed against both Gram positive (*Listeria monocytogenes* LM2 and *Staphylococcus aureus*) and Gram negative (*Salmonella typhimurium* and *Escherichia coli*) pathogenic bacteria.

For the four bacterial species selected, certified and characterized strains, as indicated in the following Tables 1 and 2, were used.

The assessment of the concentration of RiLK1 peptides capable of inhibiting 50% of bacterial growth ($IC_{50}$) was performed by the broth microdilution assay as described in Wang HX and Ng TB (2003, Peptides 24:969-972).

Standard deviations were obtained from triplicate experiments for each peptide dilution, and the IC50s were determined using GraphPad Prism version 6.00 (Graph-Pad Software, La Jolla California USA).

All bactericidal activity assays were performed using 2-3 log CFUs (Colony Forming Units), which represents a realistic approximation of the contamination levels that may be contained in the tubular conduits for food or medical use.

*Staphylococcus aureus*

A control stock suspension was prepared in which $10^1$ CFUs of *S. aureus* were inoculated in 10 ml of BPW. 5 mM stock solutions of the RiLK1 peptides were then prepared and serial dilutions (100 to 1 µM) were carried out in BPW and inoculated with $10^3$ CFUs of *S. aureus*, and then incubated for 6 hours at 37° C. At the same time, control samples were prepared and treated in the same way but without the addition of the peptides.

50 µl of each bacterial suspension were poured onto blood agar or rabbit plasma fibrinogen agar Petri dishes and incubated for 20 hours at 37° C.

All experimental conditions investigated used the plate count method to estimate the bactericidal activity of the peptides. Specifically, the numbers of colonies grown on agar plates seeded with the bacterial suspensions in the absence or presence of the individual peptide dilutions were counted and compared. Standard deviations were determined using statistical software.

*Listeria monocytogenes*

A control stock suspension was prepared in which $10^3$ CFUs of *L. monocytogenes* were inoculated in 10 ml of Half Fraser Broth and serial dilutions (100 to 0.01 µM) of the suspension were performed. 5 mM stock solutions of the peptides in DMSO were then prepared and serial dilutions (100 to 0.01 µM) were carried out in Fraser Broth and inoculated with $10^3$ CFUs of *L. monocytogenes*, and then incubated for 6 hours at 37° C. At the same time, control samples were prepared and treated in the same way but without the addition of the peptides. 50 µl of each bacterial suspension were seeded on different culture plates: blood agar and ALOA (Oxoid, Basingstoke, UK), which were then incubated for 24-48 hours at 37° C. Each dilution series included control plates inoculated with DMSO without the peptide and control plates with bacteria only.

*Salmonella typhimurium*

A control stock suspension was prepared in which $10^3$ CFUs of *S. typhimurium* were inoculated in 10 ml of BPW (Oxoid, Basingstoke, UK). 5 mM stock solutions of the peptides were then prepared and serial dilutions (100 to 1 µM) were carried out in BPW and inoculated with $10^3$ CFUs of *S. typhimurium*, and then incubated for 6 hours at 37° C. 50 µl of each bacterial suspension were seeded on Petri dishes with blood agar or chromogenic agar (Oxoid, Basingstoke, UK) and incubated for 20 hours at 37° C. Each dilution series included control plates inoculated with DMSO without the peptide and control plates with bacteria only.

*Escherichia coli*

A control stock suspension was prepared in which $10^3$ CFUs of *E. coli* were inoculated in 10 ml of BPW (Oxoid, Basingstoke, UK). 5 mM stock solutions of the peptides were then prepared and serial dilutions (100 to 1 µM) were carried out in BPW and inoculated with $10^3$ CFUs of *E. coli*, and then incubated for 6 hours at 37° C. 50 µl of each bacterial suspension were seeded on Petri dishes with blood agar or chromogenic agar (Oxoid, Basingstoke, UK) and incubated for 20 hours at 37° C. Each dilution series included control plates inoculated with DMSO without the peptide and control plates with bacteria only.

FIG. 1 depicts the dose-response curve obtained with the RiLK1 peptide against *S. aureus* (A), *L. monocytogenes* (B), *S. typhimurium* (C), and *Escherichia coli* (D).

On the basis of the dose-response curves obtained, the $IC_{50}$ values (peptide concentration capable of inhibiting 50% of bacterial growth) against the bacterial strains mentioned above were determined.

The data reported in Table 1 show that the RiLK1 peptide exhibits strong bactericidal activity against all the tested bacteria ($IC_{50}$<2 µM); in particular, a stronger bactericidal activity is observed against *S. typhimurium*, *E. coli* and *L. monocytogenes* ($IC_{50}$<1.5 µM) and an even stronger bactericidal activity is observed against *L. monocytogenes* ($IC_{50}$ 0.46 µM).

TABLE 1

| Bacterium | RiLK1 $IC_{50}$ [µM] |
|---|---|
| *S. aureus* (ATCC) | 1.98 |
| *L. monocytogenes* (LM2) (field strain) | 0.46 |
| *S. Typhimurium* (ATCC) | 1.30 |
| *E. coli* (ATCC) | 1.20 |

Example 2b—Evaluation of the Minimum Bactericidal Concentration (MBC)

The evaluation of the Minimum Bactericidal Concentration (MBC), i.e., the lowest concentration of antimicrobial agent capable of 99.9% inhibition of bacterial growth on plates, was carried out as described in Bilikova et al, (2015, Peptides 68:190-196).

The data reported in Table 2 below show that the RiLK1 peptide exhibits strong bactericidal activity against all the tested bacteria (MBC <20 µM); in particular, a stronger bactericidal activity is observed against *L. monocytogenes*, *S. typhimurium* and *E. coli* (MBC <5 µM) and an even stronger bactericidal activity is observed against *L. monocytogenes* and *E. coli* (MBC 2 µM).

TABLE 2

| Bacterium | RiLK1 MBC [µM] |
|---|---|
| *S. aureus* (ATCC) | 16 |
| *L. monocytogenes* (LM2) (field strain) | 2 |
| *S. typhimurium* (ATCC) | 4 |
| *E. coli* (ATCC) | 2 |

Figure 2A:
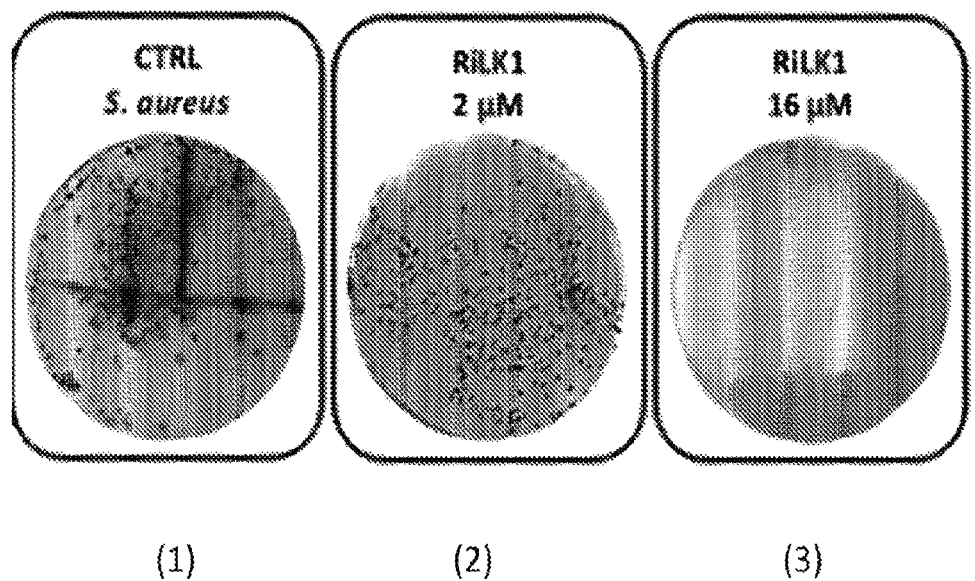
FIGS. 2a, 2b, 2c and 2d show for each bacterium tested, i.e., *S. aureus*, *L. monocytogenes*, *S. typhimurium* and *E. coli*, respectively, (In FIGS. 2c and 2d it is necessary to correct the caption relating to *S. typhimurium* and *E. coli*) photographic images of a control plate incubated with the bacterium without the addition of the RiLK1 peptide (1), a plate incubated with the bacterium and treated with a RiLK1 peptide concentration lower than its MBC (2), a plate incubated with the bacterium and treated with a RiLK1 peptide concentration corresponding to its MBC (3), as described in Example 2b.

The images in FIG. 2a represent photographic images of (1) the control plate incubated with *S. aureus* without the addition of the RiLK1 peptide, (2) the plate incubated with *S. aureus* and treated with 2 µM RiLK1 peptide, (3) the plate incubated with *S. aureus* and treated with 16 µM RiLK1 peptide, which shows that at a concentration of 16 µM this peptide is able to inhibit almost 100% of the bacterial growth.

Figure 2B:
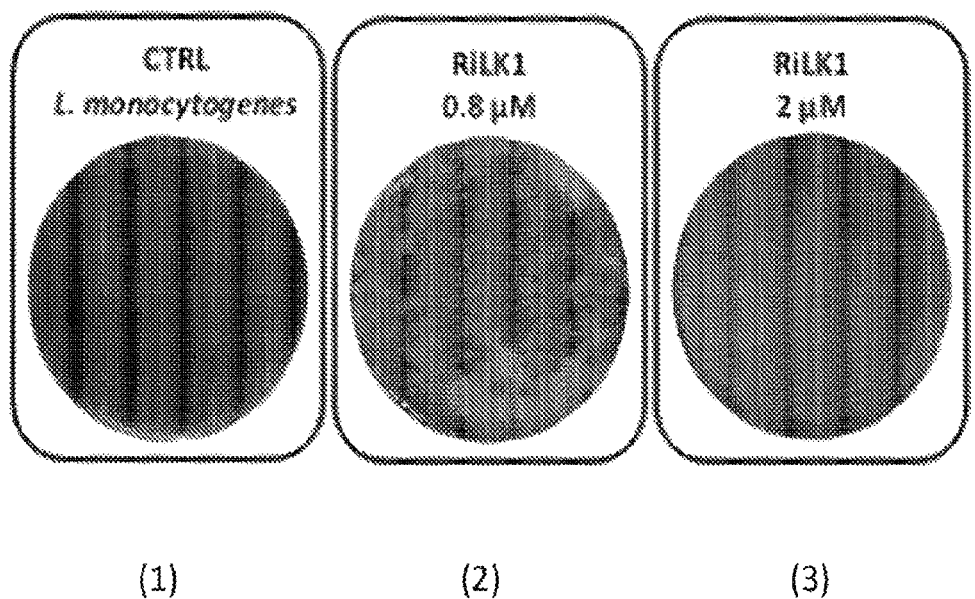

The images in FIG. 2b represent photographic images of (1) the control plate incubated with *L. monocytogenes* without the addition of the RiLK1 peptide, (2) the plate incubated with *L. monocytogenes* and treated with 0.8 µM RiLK1 peptide, (3) the plate incubated with *L. monocytogenes* and treated with 2 µM RiLK1 peptide, which shows that at a concentration of 2 µM this peptide is able to inhibit almost 100% of the bacterial growth.

Figure 2C:
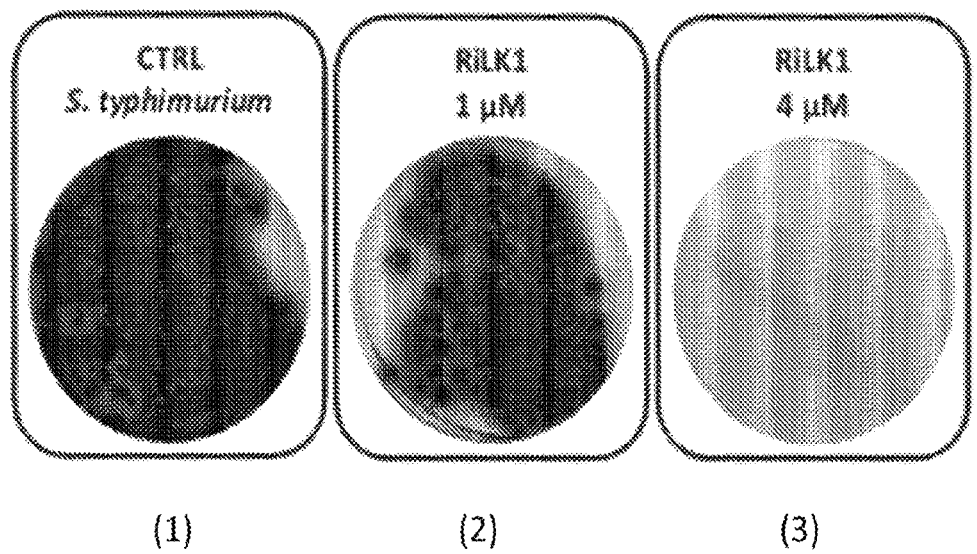

The images in FIG. 2c represent photographic images of (1) the control plate incubated with *S. typhimurium* without the addition of the RiLK1 peptide, (2) the plate incubated with *S. typhimurium* and treated with 0.8 µM RiLK1 peptide, (3) the plate incubated with *S. typhimurium* and treated with 2 µM RiLK1 peptide, which shows that at a concentration of 2 µM this peptide is able to inhibit almost 100% of the bacterial growth.

Figure 2D:
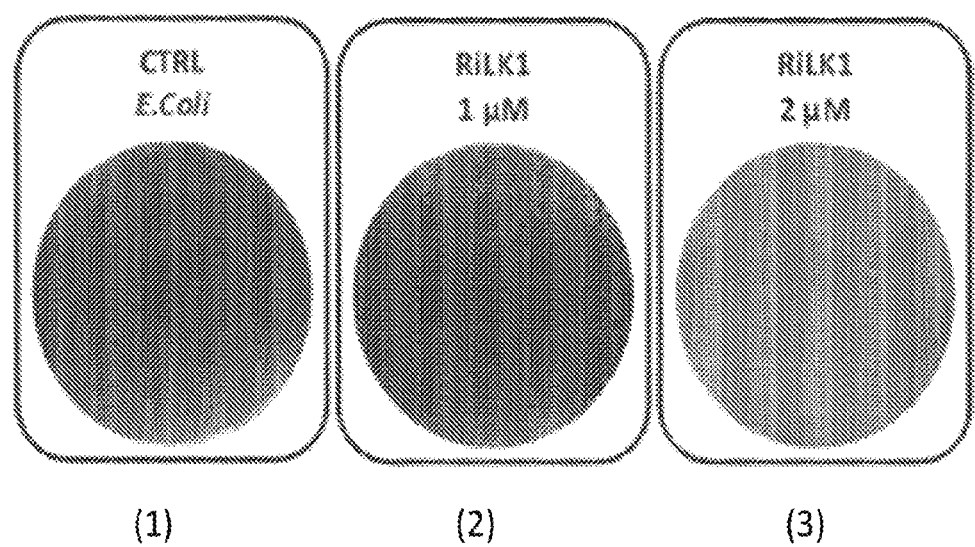

The images in FIG. 2d represent photographic images of (1) the control plate incubated with *E. coli* without the addition of the RiLK1 peptide, (2) the plate incubated with *E. coli* and treated with 0.8 µM RiLK1 peptide, (3) the plate incubated with *E. coli* and treated with 2 µM RiLK1 peptide, which shows that at a concentration of 2 µM this peptide is able to inhibit almost 100% of the bacterial growth.

Example 2c—Analysis of the Activity Against Fungi and Yeasts

Evaluation of the RiLK1 peptide concentration capable of inhibiting the growth of the fungus *Aspergillus brasiliensis*

The antifungal activity of the RiLK1 peptide was determined against *Aspergillus brasiliensis*. For this purpose, a stock culture was prepared in which $10^5$ CFUs of *A. brasiliensis* were inoculated in 10 ml of buffered peptone water. A reference strain (ATCC 9341) was used for this fungal species. The culture was incubated for 6 h at 37° C. with the RiLK1 peptide at 25 µM concentrations.

At the same time, control samples were incubated without adding the peptide. 100 µl of the samples thus prepared were seeded on DG18 plates (Dichloran 18% Glycerol Agar—ISO 21527-2) and incubated at 25° C. for 7 days.

All experimental conditions investigated used the plate count method to estimate the fungicidal activity of the peptide. Specifically, the numbers of colonies grown on agar plates seeded with the fungal suspensions in the absence or presence of the individual peptide dilutions were counted and compared. The standard deviations of the triplicate incubations of each plate were determined using statistical software. The evaluation of the Minimum Fungicidal Concentration (MFC), i.e., the lowest concentration of antifungal agent capable of 99.9% inhibition of fungal growth on plates, was carried out as described in Bilikova et al, (2015, Peptides 68:190-196).

The RiLK1 peptide has strong fungicidal activity against the tested fungus, with an MFC value less than or equal to 25 µM. It should be noted that the peptide IDR-1018-K6 (object of patent WO2019012158) against the same fungus and under the same experimental conditions is not active, with a post-treatment decrease in the fungal load of 0 Log compared to the significant decrease induced by RiLK1 (5 Log reduction).

Evaluation of the RiLK1 Peptide Concentration Capable of Inhibiting the Growth of the Yeast *Candida albicans*

The inhibitory activity of the RiLK1 peptide was determined against the yeast *Candida albicans*. A stock culture was prepared in which $10^5$ CFUs of *C. albicans* were inoculated in 10 ml of buffered peptone water. A reference strain (ATCC 14053) was used for this species. The culture was incubated for 6 h at 37° C. with the RiLK1 peptide at 25 µM concentrations. At the same time, control samples were incubated without adding the peptide. 100 µl of the samples thus prepared were seeded on DG18 plates (Dichloran 18% Glycerol Agar—ISO 21527-2) and incubated at 25° C. for 7 days.

All experimental conditions investigated used the plate count method to estimate the antimycotic activity of the peptide. Specifically, the numbers of colonies grown on agar plates seeded with the cultures in the absence or presence of the individual peptide dilutions were counted and compared. The standard deviations of the triplicate incubations of each plate were determined using statistical software. The evaluation of the Minimum Fungicidal Concentration (MFC), i.e., the lowest concentration of antifungal agent capable of 99.9% inhibition of fungal growth on plates, was carried out as described in Bilikova et al, (2015, Peptides 68:190-196).

The RiLK1 peptide has strong antimycotic activity against *C. albicans*, with an MFC value less than or equal to 25 µM. It should be noted that, as shown in Table 3, the peptide IDR-1018-K6 (described in patent application WO2019012158) against the same fungus and under the same experimental conditions exhibits low efficiency, with a post-treatment decrease in the fungal load of 1.0 Log compared to the significant decrease induced by RiLK1 (5 Log reduction).

TABLE 3

| Fungus | RiLK1 Drop Log CFU/ml | IDR-1018-K6 Drop Log CFU/ml |
|---|---|---|
| *A. brasiliensis* | 5 | 0 |
| *C. albicans* | 5 | 1.0 |

Example 3—Functionalization of Straws with the Antimicrobial Peptide

Polylactic acid (PLA) straws prepared by extrusion with equipment from Hangzhou Depth Machinery Co., Ltd. were functionalized with the RiLK1 peptide prepared in Example 1. Specifically, the straws were first dry activated by plasma treatment (50-100 W for 5 min) using an oxygen plasma (Atmospheric Plasma Surface Treatment Machine with Three Rotary Nozzles—Shenzhen Fangrui Technology Co., Ltd.) and subsequently incubated for 24 hours in a 50 µM RiLK1 solution. At the end of the process, the peptide was covalently linked to reactive groups present on the surfaces of the polylactic acid straw.

Figure 3:
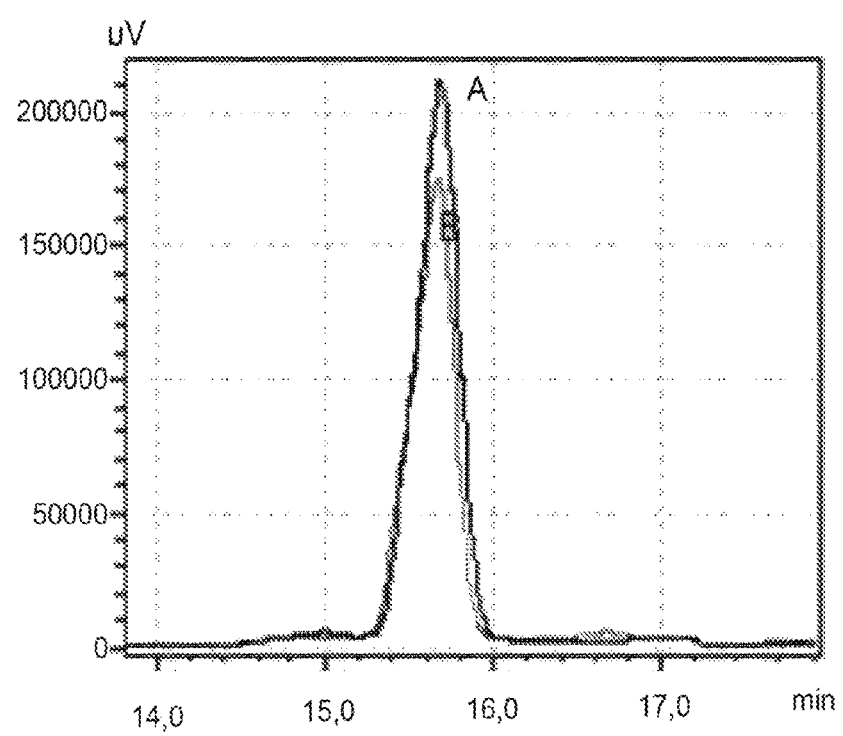
FIG. 3 shows the reverse phase chromatographic plots, obtained using a C18 column through an HPLC system as described in Example 3, of the RiLK1 peptide present in the composition at time point=zero (Line A), and of the RiLK1 peptide remaining in the composition at time point=24 hours (Line B). The graph depicts the absorbance values of the RiLK1 peptide at 280 nm as a function of the elution time, measured in minutes (min).
Figure 4:
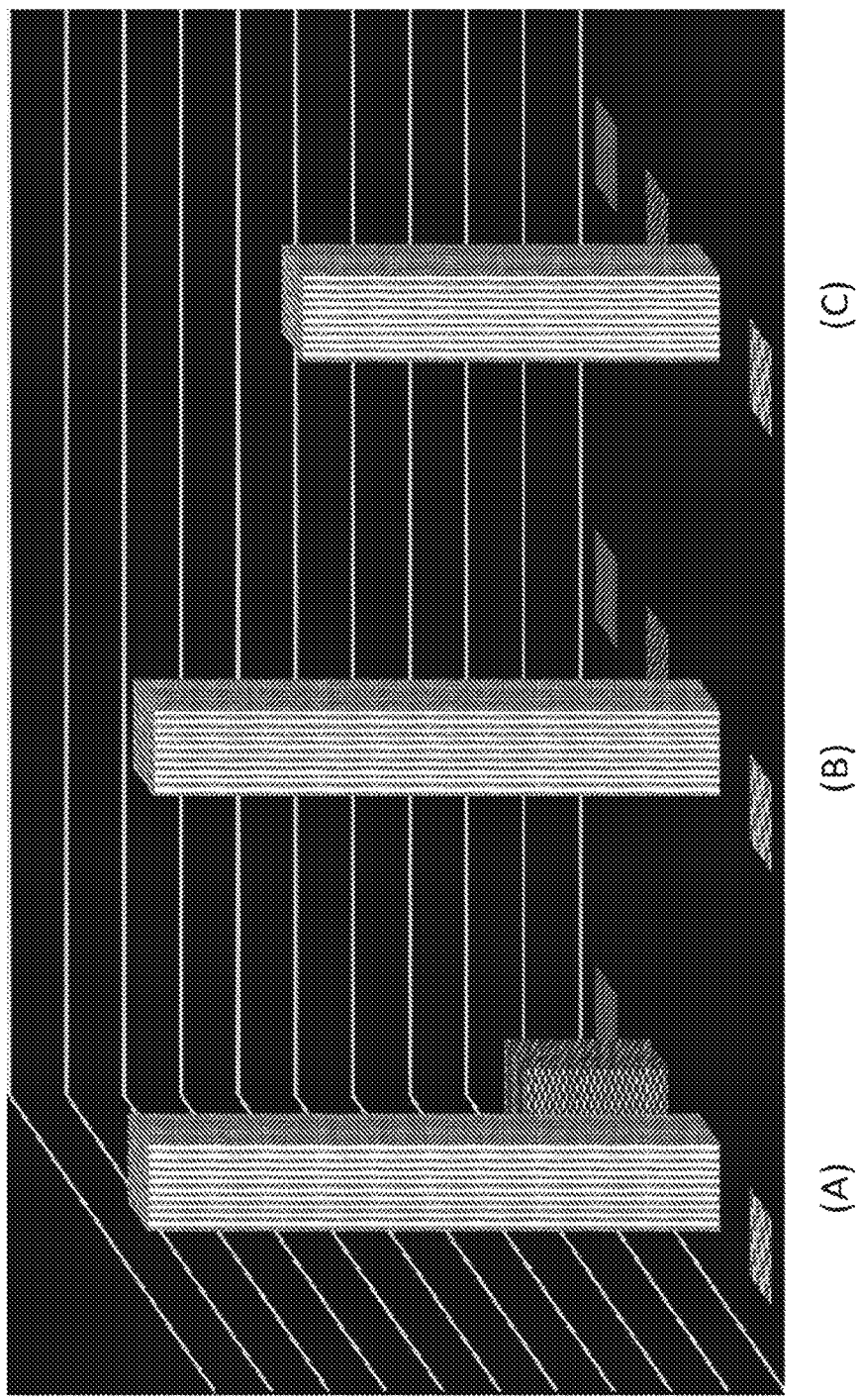
FIG. 4 shows the % decrease in bacterial load expressed as CFUs of a liquid culture of *E. coli* (A), *S. typhimurium* (B), and *L. monocytogenes* (C) in which a straw was inserted for 4, 6, 8 and 24 hours of contact.

FIG. 3 shows the reverse phase chromatographic plots obtained using a C18 column and an HPLC system. Line A shows the absorption peak of the RiLK1 peptide present in the composition at time point=zero, that is, before the incubation of the activated polylactic acid straw. Line B shows the absorption peak of the RiLK1 peptide remaining in the composition at time point=24 hours, that is, after 24 hours of incubation of the straw. After 24 hours of incubation, the yield of the bond between the RiLK1 peptide and the straw could be estimated and was found to be 17%. Knowing the surface area of the functionalized straw, which is 11.304 $cm^2$, the number of surface-binding peptide moles was calculated and found to be 2.25 nmol×$cm^2$ of the straw.

The reverse phase chromatography performed on a C18 column through an HPLC system, after placing the straws functionalized with the RiLK1 peptide in water for 24 hours, showed the total lack of release of the peptide in the water.

Example 4—Analysis of the Bactericidal Activity of the Straws Functionalized with the Antimicrobial Peptide The straws functionalized as described in Example 3 were tested against *E. coli* (A), *S. typhimurium* (B) and *L. monocytogenes* (C), starting from a value of $10^1$-$10^2$ CFUs (Colony Forming Units); the effectiveness was assessed at 4, 6, 8 and 24 hours.

Figure 5:
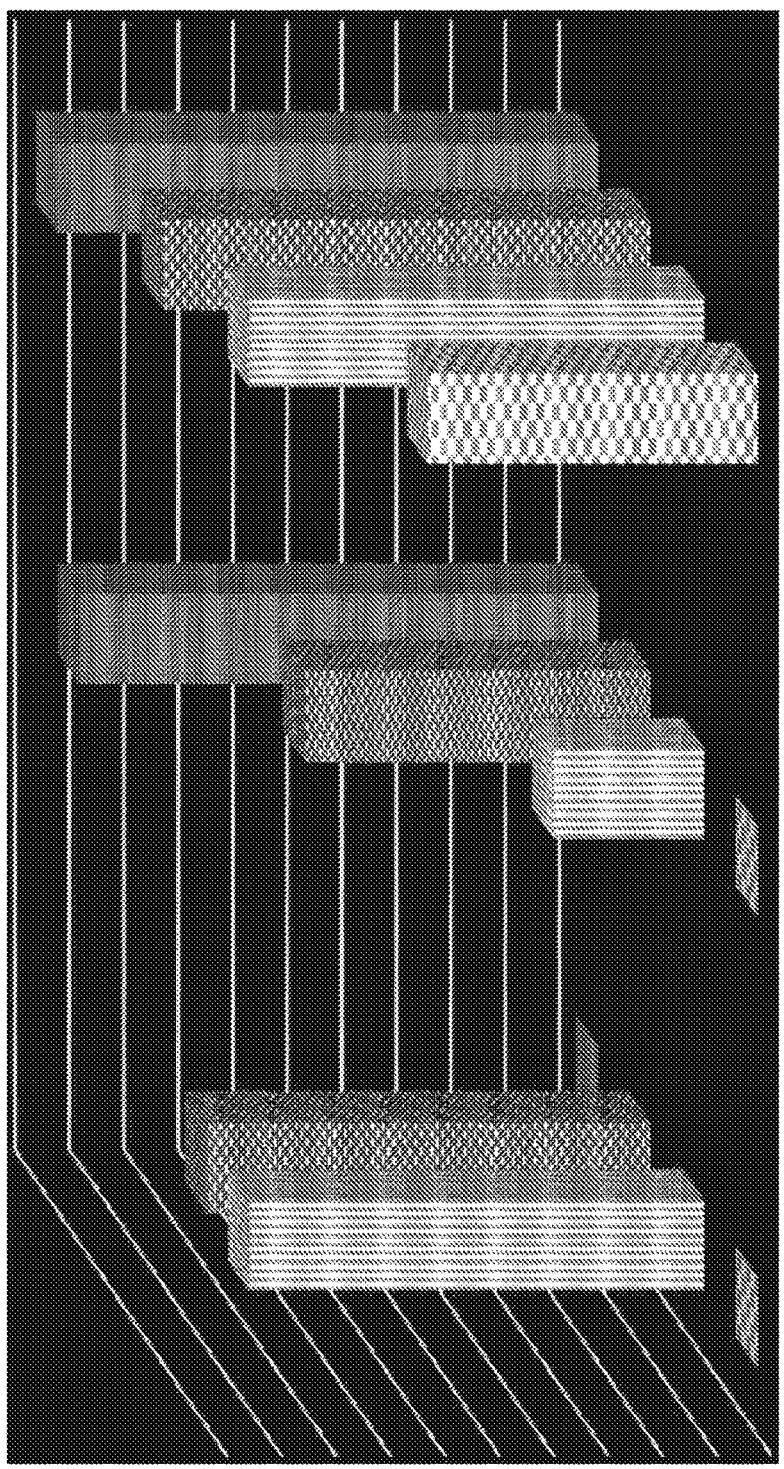
FIG. 5 shows the % decrease in bacterial load expressed as CFUs of tap water contaminated by *E. coli* (A), *S. typhimurium* (B), and *L. monocytogenes* (C) with a bacterial concentration of 150 CFU/mL in which a straw was inserted for 4, 6, 8 and 24 hours of contact.

The graph in FIG. 5 shows the case in which the straw was inserted into a culture broth, with an average of 10-100 CFUs/ml. For up to 4 hours, no reduction in the CFUs was observed, as the concentration of pathogens is still too low. At 6 hours, the functionalized straw carries out its antibacterial action against *E. coli* (100% reduction), *S. typhimurium* (99% reduction) and *L. monocytogenes* (73% reduction). For up to 6 hours, the functionalized straw still carries out its antibacterial action against *E. coli* (25% reduction). After 6 hours, at 8 and 24 hours, the bactericidal activity of the straw is zero against *S. typhimurium* and *L. monocytogenes*.

The graph in FIG. 6 shows the real case in which the straw is inserted in drinking water contaminated with 15-150 CFUs pathogens/ml.

In this case, since the liquid is not a culture broth, the growth of the pathogen is much less, and the functionalized straw carries out a bactericidal activity for up to 24 hours against *S. typhimurium* (95% reduction) and *L. monocytogenes* (99% reduction), and for up to 8 hours against *E. coli* (81.5% reduction). In this regard, it should be considered that, if the straw is integrated into a container, bottle or canteen used to drink water, this container is generally emptied and/or refilled within 8/12 hours.

Furthermore, from the above data, it is clear that the functionalized straw is a device capable of sanitizing water by causing a drop in *Listeria* and *Salmonella*, against which it is still active even after 24 hours.

As shown by the data reported in Examples 2a and 2b, respectively, the RiLK1 peptide, which is a representative of the peptides used in the present invention, has strong bactericidal activity against all the tested bacteria ($IC_{50}$<2 µM; MBC <20 µM).

As shown in Example 3, the RiLK1 peptide representative of the peptides used in the present invention is able to bind to the polymeric surface of a PLA straw with a 17% bond yield, resulting in a polymeric straw functionalized with the antimicrobial peptide; the functionalized straw placed in water for 24 hours remains stable without release of the antimicrobial peptide.

As shown in Example 4, the PLA straw functionalized with the antimicrobial peptide RiLK1 and inserted in drinking water contaminated with pathogens exhibits bactericidal activity both against Gram negative bacteria, such as *S. typhimurium* and *E. coli*, and against Gram positive bacteria, such as *L. monocytogenes*. In particular, the functionalized straw carries out a bactericidal activity for up to 24 hours against *S. typhimurium* (95% reduction) and *L. monocytogenes* (99% reduction), and for up to 8 hours against *E. coli* (81.5% reduction).

Overall, the experimental data reported above show that tubular conduits made of polymeric material whose outer and/or inner surface(s) is/are functionalized with the specific antimicrobial peptides used in the invention are particularly suitable for use in both the food and medical fields for the prevention of contamination by Gram negative and/or Gram positive bacteria.

Therefore, functionalization with the specific antimicrobial peptides used in the invention finds useful application, for example, in the prevention of contamination on the surface of straws, preferably on the surface of straws incorporated in and optionally removable from bottles, in both the food and medical fields.

Functionalization with the specific antimicrobial peptides used in the invention also finds useful application in the sanitization of liquid foods or beverages, for example water, which pass through straws, preferably through straws incorporated in and optionally removable from bottles.

The antimicrobial peptides used in the invention have the additional advantages of selectively interacting with the lipid bilayer of the bacterial membrane, causing the death of the microorganisms, and of not easily selecting mutants and not inducing antibiotic-resistance phenomena.

The polymer used in the invention has the additional advantages of being derived from 100% natural resources, therefore having zero environmental impact and being 100% biodegradable and compostable.

Example 5: Analysis of the Bactericidal Activity of Further AMP Peptides Used in the Invention The bactericidal activity of further AMP peptides used in the invention, in particular of the RiLK31 peptide (RLRWVKIWKK, SEQ ID NO:31) and the RiLK3 peptide (RLRWVRIWRR, SEQ ID NO:3), was tested. The bactericidal activity was expressed as a percentage of viable cells in terms of CFU (Colony Forming Units) in a bacterial sample exposed to each peptide compared to those in a control bacterial sample in the absence of the peptide. All tests were carried out with the same peptide concentration, corresponding to 15 µM. The results obtained are shown in Table 4.

TABLE 4

| Peptide | E. coli | Staphylococcus | Salmonella | Listeria |
| --- | --- | --- | --- | --- |
| RiLK1 | 100% | 96.9% | 100% | 99.5% |
| RiLK31 | 100% | 83% | 100% | 98.8% |
| RiLK3 | 100% | 96% | 100% | 99% |

Table 4 shows that the further tested AMP peptides have a bactericidal activity comparable to that of the RiLK1 peptide used as the representative peptide in experiments 1~4 of the present description.

Example 6: Characterization of Further AMP Peptides Used in the Invention by Computational Analysis and Comparison with the HE10 Peptide of the Prior Art In bioinformatics, sequence alignment is a way to organize DNA, RNA or protein sequences in order to identify similarity regions which may result from functional, structural or evolutionary relationships between the sequences. Aligned sequences of amino acid residues are typically represented as rows in a matrix [Analysis Tool Web Services from the EMBL-EBI. (2013) McWilliam H, Li W, Uludag M, Squizzato S, Park Y M, Buso N, Cowley A P, Lopez R. Nucleic acids research 2013 July; 41 (Web Server issue): W597-600 doi:10.1093/nar/gkt376; Principles and Methods of Sequence Analysis—Sequence—Evolution—Function—NCBI Bookshelf (Chapter 4) Koonin E V, Galperin M Y. Sequence—Evolution—Function: Computational Approaches in Comparative Genomics. Boston: Kluwer Academic; 2003; Hans G. Boman (1995). Peptide antibiotics and their role in innate immunity. Annu. Rev. Immunol. 1995. 13:61-92]. Multiple sequence alignment highlights similarity areas, which may be associated with specific features, i.e., structural/functional biases that can be more conserved than other regions.

In protein sequence alignments, the degree of similarity between amino acids occupying a particular position in the sequence can be interpreted as an approximate measure of a particular conserved region or motif in the sequence. The absence of substitutions, or the presence of highly conservative substitutions alone (i.e., the substitution of amino acids whose side chains have similar biochemical properties) in a particular region of the sequence suggests that this region may have structural or functional importance [Hans G. Boman (1995). Peptide antibiotics and their role in innate immunity. Annu. Rev. Immunol. 1995. 13:61-92; Markéta Pazderková, Petr Malo, Vlastimil Zima, Katerina Hofbauerová, Vladimir Kopecký Jr., Eva Kocišová, Tomáš Pazderka, Václav Cerovský and Lucie Bednárová (2019). Interaction of Halictine-Related Antimicrobial Peptides with Membrane Models. Int. J. Mol. Sci., 20, 631; doi:10.3390/ijms20030631; Igor Zelezetsky, Alessandro Tossi (2006). Alpha-helical antimicrobial peptides—Using a sequence template to guide structure—activity relationship studies. Biochimica et Biophysica Acta 1758: 1436-1449; Yang Wang, Jianbo Chen, Xin Zheng, Xiaoli Yang, Panpan M, Ying Cai, Bangzhi Zhang and Yuan Chena (2014). Design of novel analogues of short antimicrobial peptide anoplin with improved antimicrobial activity. J. Pept. Sci.; 20: 945-951. DOI 10.1002/psc.2705].

The presence of the same amino acid residues but in different positions in two amino acid sequences is not a gain but on the contrary leads to a decrease in the similarity score between the two peptides, as it can cause a profound structural and functional alteration.

When comparing two peptides, the correct way to identify variations and define similarity is to align the two sequences. This means placing one sequence on top of the other, so that it is easier to highlight which positions are the same and which are different. After performing the alignment, two quantitative parameters can be extracted from each pairwise comparison, namely identity and similarity. Identity defines the percentage of directly matching amino acids in the alignment. Similarity occurs when an amino acid is replaced with a similar residue, so that the physical-chemical properties are retained. For example, a change from arginine to lysine maintains the +1 positive charge. This change is much more likely to be acceptable, as the two residues have similar properties and do not impair the function of the peptide. Therefore, the percentage similarity of two sequences is the sum of the identical matches plus the similar ones. The similarity degree depends on the criteria that are used to compare two amino acid residues.

For example, the RiLK1 peptide (RLKWVRIWRR, SEQ ID NO:1) and the prior art HE10 peptide (VRLIVRIWRR, SEQ ID NO: 33) differ from one another in four positions out of a total of 10 positions. Accordingly, they are 60% identical. However, considering the four substitution pairs, R>V, L>R, K>L, W>I, it appears that the biochemical properties and the size of the residues in each pair are significantly different. Therefore, as illustrated below, the substitution of the first four residues in the RiLK1 peptide compared to HE10 significantly modifies the physical-chemical and structural properties of the peptide.

```
                                    (SEQ ID NO: 1)
RLKWVRIWRR
Peptide-RiLK1

(SEQ ID NO: 33)
VRLIVRIWRR
Peptide HE10
```

The underlined residues correspond to the positions where the two peptides differ.

As clearly shown in Table 5, the hydrophobicity, hydropathicity, amphipathicity, hydrophilicity, net charge and propensity for a disordered conformation of the claimed RiLK1 peptide are significantly different from those of HE10. These properties are known to strongly affect the characteristics of the peptides and modulate their physical-chemical characteristics, with a corresponding influence on the antimicrobial activity [Yang Wang, Jianbo Chen, Xin Zheng, Xiaoli Yang, Panpan M, Ying Cai, Bangzhi Zhang and Yuan Chena (2014). Design of novel analogues of short antimicrobial peptide anoplin with improved antimicrobial activity. J. Pept. Sci.; 20: 945-951. DOI 10.1002/psc.2705; Hyung-Sik Won, Min-Duk Seo, Seo-Jeong Jung, Sang-Jae Lee, Su-Jin Kang, Woo-Sung Son, Hyun-Jung Kim, Tae-Kyu Park, Sung-Jean Park, and Bong-Jin Lee, Structural Determinants for the Membrane Interaction of Novel Bioactive Undecapeptides Derived from Gaegurin 5. J. Med. Chem. 2006, 49, 4886-4895]. Hydrophobicity is known to affect both mammalian cell toxicity and antimicrobial activity. Hydrophobic residues facilitate interactions with fatty acyl chains. Relatively low hydrophobicity prevents binding to zwitterionic membranes found in mammalian cells, resulting in low toxicity. However, hydrophobicity is required for permeabilization of the bacterial membrane, but some studies have shown that beyond an optimal level of hydrophobicity, a further increase leads to a loss of antimicrobial activity and an increase in toxicity. Amphipathicity reflects the possibility of an amino acid sequence to form well-structured hydrophobic and hydrophilic domains on opposite faces. The Boman index was originally designated as the protein binding potential and was later renamed as the Boman index. This function calculates the sum of the solubility values for all residues in a sequence and, for normalization, is divided by the number of residues. The Boman index provides an overall estimate of the membrane binding potential of a peptide. The propensity of proteins or peptides for an (intrinsically) disordered conformation plays a key role in cellular regulation and signalling processes. Proteins and peptides under different biological conditions show marginal structural stability, and repeatedly unfold and fold in vivo. Indeed, numerous studies have shown that the effects of the denatured state, such as residual structure, excluded volume and intrinsic conformational propensities, play a key role in molecular recognition, allosteric signalling, folding, and stability [Peter Tompa, Eva Schad, Agnes Tantos and Lajos Kalmar (2015). Intrinsically disordered proteins: emerging interaction specialists. Current Opinion in Structural Biology, 35:49-59. doi.org/10.1016/j.sbi.2015.08.009].

TABLE 5

|  | RiLK1 | HE10 |
|---|---|---|
| Half-life (sec) | 855.71 | 835.91 |
| Hydrophobicity | −0.56 | −0.36 |
| Hydropathicity | −1.12 | 0.23 |

TABLE 5-continued

|  | RiLK1 | HE10 |
| --- | --- | --- |
| Amphipaticity | 1.35 | 0.98 |
| Hydrophilicity | 0.31 | 0.02 |
| Net charge | 5.0 | 4.0 |
| Boman index | 4.67 | 3.45 |
| Propensity for a disordered conformation | −0.61 | −0.09 |

Table 5 therefore clearly shows that the RiLK1 peptide used in the invention and the HE10 peptide of the prior art exhibit considerable differences in terms of chemical-physical properties. It therefore appears that a 60% identity percentage (which should be considered low in any case) cannot in any way be considered predictive of a chemical-physical and therefore functional similarity between the two peptides.

This is further confirmed by the data in Table 6, which shows the same prediction, carried out with the same algorithms, on 4 other AMP peptides of the invention. These 4 peptides also exhibit values of hydrophobicity, hydropathicity, amphiphilicity, hydrophilicity, net charge, Boman index and propensity for a disordered conformation similar to each other and to RiLK1 but completely different compared to HE10.

TABLE 6

|  | RiLK1 | RiLK2 | RiLK4 | RiLK7 | RiLK23 | HE10 |
| --- | --- | --- | --- | --- | --- | --- |
| Half-life (sec) | 855.71 | 855.71 | 920.11 | 855.71 | 920.11 | 835.91 |
| Hydrophobicity | −0.56 | −0.56 | −0.49 | −0.56 | −0.49 | −0.36 |
| Hydropathicity | −1.12 | −1.12 | −1.06 | −1.12 | −1.06 | 0.23 |
| Amphipaticity | 1.35 |  |  |  |  | 0.98 |
| Hydrophilicity | 0.31 | 0.31 | 0.31 | 0.31 | 0.31 | 0.02 |
| Net charge | 5.0 | 5.0 | 5.0 | 5.0 | 5.0 | 4.0 |
| Boman index | 4.66 | 4.66 | 5.6 | 4.66 | 3.73 | 3.45 |
| Propensity for a disordered conformation | −0.61 | −0.61 | −0.62 | −0.61 | −0.59 | −0.09 |

The inventors also found that the presence of more than one tryptophan (W) residue—a feature common to all the AMP peptides of the invention—plays an important role in determining the antimicrobial properties, as it represents an advantageous and distinctive feature of the interface region between the lipid bilayers. It is also known that the side chains of tryptophan residues are involved in peptide folding in aqueous solution [David I. Chan, Elmar J. Prenner, Hans J. Vogel (2006). Tryptophan- and arginine-rich antimicrobial peptides: Structures and mechanisms of action. Biochimica et Biophysica Acta 1758; 1184-1202 doi:10.1016/ibbamem.2006.04.006]. Considering not only the effects of the primary structure but also those of the secondary structure on the antimicrobial activity, the ability to assume an amphipathic structure is a functionally important feature for AMP incorporation into bacterial membranes [Marlon H. Cardoso, Karen G. N. Oshiro, Samilla B. Rezende, Elizabete S. Candido, Octávio L. Franco. The Structure/Function Relationship in Antimicrobial Peptides: What Can we Obtain From Structural Data? Advances in Protein Chemistry and Structural Biology—February 2018, DOI: 10.1016/bs.apcsb.2018.01.008]. All the AMP peptides of the invention have at least a second tryptophan residue inserted in the central part of the sequence, which has the purpose of enhancing the amphipathicity of the helix.

NMR analysis of the RiLK1 peptide in a micellar environment (SDS) has clearly demonstrated the existence of a well-defined structure in the helical arrangement, which places the positively charged side chains and the hydrophobic side chains on opposite sides. In this arrangement, all charged side chains are iso-oriented and prone to interact with the negatively charged surface of the SDS micelles.

Furthermore, the two side chains of the tryptophan residues, which are present in the W-X-X-X-W motif that characterizes all the AMP peptides used in the present invention, are located at a suitable distance for mutual stacking, thus contributing to the stabilization of the helix.

The HE10 decapeptide described in WO2015038339 and all the 10 amino acid-long analogues thereof, on the other hand, do not contain the W-X-X-X-W motif which characterizes the AMP peptides used in the invention and which, for the reasons illustrated above, represents a functionally important feature for the bactericidal activity.

Therefore, the AMP peptides used in the invention are not similar to the HE10 peptide of the prior art neither in structural nor in functional terms.

What is claimed is:

1. A tubular conduit comprising an outer surface and an inner surface, wherein at least one portion of the outer surface and/or inner surface is functionalized with at least one antimicrobial peptide consisting of the amino acid sequence having the following general formula:

$X_1LX_2WVX_3IWX_4X_5$ wherein $X_1$, $X_2$, $X_3$, $X_4$ and $X_5$ are independently selected from the group consisting of K and R and wherein each amino acid is independently in the D or L configuration, or a salt or solvate thereof.

2. The tubular conduit of claim 1, wherein the at least one antimicrobial peptide is covalently linked to reactive groups that are present on the outer surface and/or inner surface of the tubular conduit or the at least one antimicrobial peptide is contained in a coating adhered to the least one portion of the outer surface and/or inner surface.

3. The tubular conduit of claim 1, wherein at least one of $X_1$, $X_3$, $X_4$ and $X_5$ has the meaning of R.

4. The tubular conduit of claim 1, wherein the at least one antimicrobial peptide consists of an amino acid sequence selected from the group consisting of RLKWVRIWRR, (SEQ ID NO: 1)
KLRWVRIWRR, (SEQ ID NO: 2)
RLRWVRIWRR, (SEQ ID NO: 3)
KLKWVRIWRR, (SEQ ID NO: 4)
RLKWVKIWRR, (SEQ ID NO: 5)
KLRWVKIWRR, (SEQ ID NO: 6)
RLRWVKIWRR, (SEQ ID NO: 7)
KLKWVKIWRR, (SEQ ID NO: 8)
RLKWVRIWKR, (SEQ ID NO: 9)
KLRWVRIWKR, (SEQ ID NO: 10)
RLRWVRIWKR, (SEQ ID NO: 11)
KLKWVRIWKR, (SEQ ID NO: 12)
RLKWVKIWKR, (SEQ ID NO: 13)
KLRWVKIWKR, (SEQ ID NO: 14)
RLRWVKIWKR, (SEQ ID NO: 15)
KLKWVKIWKR, (SEQ ID NO: 16)
RLKWVRIWRK, (SEQ ID NO: 17)
KLRWVRIWRK, (SEQ ID NO: 18)
RLRWVRIWRK, (SEQ ID NO: 19)
KLKWVRIWRK, (SEQ ID NO: 20)
RLKWVKIWRK, (SEQ ID NO: 21)
KLRWVKIWRK, (SEQ ID NO: 22)
RLRWVKIWRK, (SEQ ID NO: 23)
KLKWVKIWRK, (SEQ ID NO: 24)
RLKWVRIWKK, (SEQ ID NO: 25)
KLRWVRIWKK, (SEQ ID NO: 26)
RLRWVRIWKK, (SEQ ID NO: 27)
KLKWVRIWKK, (SEQ ID NO: 28)
RLKWVKIWKK, (SEQ ID NO: 29)
KLRWVKIWKK, (SEQ ID NO: 30)
RLRWVKIWKK and (SEQ ID NO: 31)
KLKWVKIWKK, (SEQ ID NO: 32)

and wherein each amino acid is independently in the D or L configuration.

5. The tubular conduit of claim 1, wherein the tubular conduit is a drinking straw or a medical tube.

6. The tubular conduit of claim 1, wherein the number of moles of the at least one antimicrobial peptide present on the at least one portion of the outer surface and/or inner surface of the tubular conduit is between 1 and 10 nmol×cm$^2$.

7. The tubular conduit of claim 1, which wherein the tubular conduit is made of polymeric material, glass, or metal.

8. The tubular conduit of claim 7, wherein the tubular conduit is made of a polymeric material selected from the group consisting of styrene block copolymers, polyolefin mixtures, elastomeric mixtures, thermoplastic polyurethanes, thermoplastic copolyesters, thermoplastic polyamides, polypropylene, polyethylene, high density polyethylene, low density polyethylene, polyethylene terephthalate, poly-1,4 cyclohexanedimethylene terephthalate, polyethylene 2,6 naphthalate dibenzoate, polyolefin, polyvinylidene fluoride, polyethylene 2,6 naphthalate, acrylonitrile butadiene styrene, polyvinyl chloride, polyether block amide, biodegradable polymers, and mixtures thereof.

9. The tubular conduit of claim 1, wherein $X_2$ has the meaning of K.

10. The tubular conduit of claim 1, wherein the tubular conduit is a drinking straw incorporated in and optionally removable from a container.

11. The tubular conduit of claim 7, wherein the tubular conduit is a biodegradable polymer selected from the group consisting of polylactic acid (PLA), polybutylene adipate-co-terephthalate (PBAT), polycaprolactone (PCL), modified starch (MaterBi®) or polyglycolic acid (PGA), polybutylene succinate (PBS), poly-hydroxy alkanoates (PHA), and mixtures thereof.

12. The tubular conduit of claim 7, wherein the tubular conduit is polylactic acid.

* * * * *